US008646085B2

(12) United States Patent
Norrman et al.

(10) Patent No.: US 8,646,085 B2
(45) Date of Patent: Feb. 4, 2014

(54) APPARATUS FOR RECONFIGURATION OF A TECHNICAL SYSTEM BASED ON SECURITY ANALYSIS AND A CORRESPONDING TECHNICAL DECISION SUPPORT SYSTEM AND COMPUTER PROGRAM PRODUCT

(75) Inventors: Karl Norrman, Stockholm (SE); Jonathan Cederberg, Uppsala (SE); Mats Näslund, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 568 days.

(21) Appl. No.: 12/682,542

(22) PCT Filed: Sep. 23, 2008

(86) PCT No.: PCT/EP2008/062667
§ 371 (c)(1),
(2), (4) Date: Aug. 30, 2010

(87) PCT Pub. No.: WO2009/047113
PCT Pub. Date: Apr. 16, 2009

(65) Prior Publication Data
US 2010/0325412 A1    Dec. 23, 2010

Related U.S. Application Data

(60) Provisional application No. 60/960,693, filed on Oct. 10, 2007.

(51) Int. Cl.
*G06F 21/00* (2013.01)
(52) U.S. Cl.
USPC ............. 726/25; 713/100; 713/151; 713/152; 726/23
(58) Field of Classification Search
USPC .............................. 726/25, 23, 24; 706/15, 60
See application file for complete search history.

(56) References Cited

U.S. PATENT DOCUMENTS 5,850,516 A * 12/1998 Schneier .......................... 726/25
7,013,395 B1 * 3/2006 Swiler et al. .................... 726/25

(Continued)

FOREIGN PATENT DOCUMENTS

WO    WO 2006/033112    3/2006

OTHER PUBLICATIONS

Bruce Schneier "Attack Trees"; http://www.schneier.com/paper-attacktrees-ddj-ft.html; Dr Dobb's Journal, v.24, n.12; Dec. 1999.*

(Continued)

*Primary Examiner* — Taghi Arani
*Assistant Examiner* — Jason Lee
(74) *Attorney, Agent, or Firm* — Nixon & Vanderhye, P.C.

(57) ABSTRACT

The invention relates to an apparatus for analyzing and reconfiguring a technical system (2) with respect to security, as well as a corresponding decision support system and computer program product. A graph constructor (20) provides, based on technical information about the system (2) received via an input interface (10), a representation of potential attacks in a directed graph of attack nodes. A system/countermeasure analysis unit (30) ranks different sets of countermeasures to enable a selected set of countermeasures to be taken to improve security. The analysis unit (30) performs the following procedure for each set of countermeasures: i) logically apply the set of countermeasures to attacks in the directed graph, and ii) determine a rank of the applied set of countermeasures based on the effectiveness of the countermeasures with respect to the reduction of the risk of attacks. An output and/or control unit (40) may then provide appropriate control signaling and/or effectuate appropriate control actions for reconfiguration of the technical system (2).

25 Claims, 33 Drawing Sheets

(56) References Cited

U.S. PATENT DOCUMENTS

2006/0117386 A1* 6/2006 Gupta et al. .................. 726/23
2007/0016955 A1* 1/2007 Goldberg et al. ............. 726/25
2007/0168311 A1 7/2007 Genty et al.

OTHER PUBLICATIONS

International Search Report for PCT/EP2008/062667, mailed Jan. 27, 2009.
Amenaza Technologies Limited, "The Secur/Tree® BurgleHouse Tutorial", Technical report, The Secur/Tree Version 2.5 Tutorial, Aug. 2006.
Daley et al, "A Structural Framework for Modeling Multi-Stage Network Attacks". IEEE Proceedings of the International Conference on Parallel Processing Workshops (ICPPW'02), 2002.
Dawkins et al, "Modeling Network Attacks: Extending the Attack Tree Paradigm". In Proc. of Third Intl. Systems Security Engineering, 2002.
Dawkins et al, "A Systematic Approach to Multi-Stage Network Attack Analysis", Proceedings of the Second IEEE International Information Assurance Workshop (IWIA'04), p. 48, Washington, D.C., USA, IEEE Computer Society, 2004.
Balbo et al, "Introductory Tutorial—Petri Nets", Petri Nets 2000, $21^{st}$ International Conference on Application and Theory of Petri Nets, Aarhs, Denmark, Jun. 26-30, 2000.
Larson et al, "Modeling Internet Attacks", Proceedings of the 2001 IEEE Workshop on Information Assurance and Security, United States Military Academy, West Point, NY, Jun. 5-6, 2001, pp. 54-59.
Mauw et al, "Foundations of Attack Trees" International Conference on Information Security and Cryptology—icisc 2005, LNCS 3935, pp. 186-198, Seoul, Korea, 2005. Springer-Verlag, Berlin.
McDermott, "Attack Net Penetration Testing", NSPW '00: Proceedings of the 2000 workshop on New security Paradigms, pp. 15-21, New York, N.Y., USA, 2000.
Opel, "Design and Implementation of a Support Tool for Attack Trees", Internship Thesis, Technische Universiteit Eindhoven, Department of Mathematics and Computer Science, Eindhoven Computer Science Security Group, Mar. 2005.
Schneier, "Attack Trees; Modeling Security Threats", Dr Dobbs Journal, Dec. 1999.
Sheyner et al, "Tools for Generating and Analyzing Attack Graphs", FMCO, vol. 3188 of Lecture Notes in Computer Science, pp. 344-372, Springer, 2003.
Moore et al, "Visual NRM User's Manual", Naval Research Laboratory, Washington, DC 20375-5320, NRL/FR/5540-00-9950, May 31, 2000.
Vesley et al, "Fault Tree Handbook with Aerospace Applications", Version 1.1, Prepared for NASA Office of Safety and Missing Assurance, Aug. 2002.

\* cited by examiner

APPARATUS FOR RECONFIGURATION OF A TECHNICAL SYSTEM BASED ON SECURITY ANALYSIS AND A CORRESPONDING TECHNICAL DECISION SUPPORT SYSTEM AND COMPUTER PROGRAM PRODUCT

This application is the U.S. national phase of International Application No. PCT/EP2008/062667 filed 23 Sep. 2008, which designated the U.S. and claims the benefit of U.S. Provisional Application No. 60/960,693 filed 10 Oct. 2007, the entire contents of each of which are hereby incorporated by reference.

TECHNICAL FIELD

The invention relates to an apparatus for reconfiguration of a technical system based on analysis of security threats, security risks or attacks to the technical system, as well as a corresponding technical decision support system and computer program product.

BACKGROUND

The security of a technical system or corresponding technical process is per se of technical nature involving a technical understanding of underlying system vulnerabilities and security threats. Examples of technical systems that may be of interest from a security aspect include industrial processing systems such as more or less automated manufacturing processes, information/communication systems and transportation systems. Such systems contain tangible or non-tangible assets which motivates malicious parties into attempting to attack the systems in order to take control over these assets. However, in some cases the attacker(s) may be more interested in the reputation obtained from (successfully) attacking the system than the asset itself. This is for instance common among "computer hackers".

It may be useful to begin by describing some conventional concepts in the field of general security analysis. Although some of the examples presented below are rather simple for improved understanding of the underlying concepts, it should be understood that in practice the systems under consideration are always technical systems. Often, the technical systems are rather complex systems with technical relations and dependencies on multiples levels.

A Brief Introduction to the Attack Tree Concept

The Attack Tree (AT) concept was introduced by Bruce Schneier in [11]. The following introduction is based on this reference, but is slightly modified.

What is an Attack Tree?

An attack tree is a way to represent knowledge of the vulnerabilities of a technical system. That knowledge has to be acquired in some way, and for that, ATs are only marginally useful. This is an important point to make, that ATs do not add knowledge about what security threats there are, but instead they provide a way to represent the knowledge and facilitating the process of determining the relative importance of the threats.

Attack Tree Construction

An attack tree is ideally constructed with a top-down, divide-and-conquer approach. The concept can easily be understood by a simple example where the attacker is trying to open a safe (most likely motivated by the prospect of gaining access to the safe's content). Thus, the technical system in question is a safe, and the asset that is being threatened is the contents of the same. The first step is to define the goal of the attack that one wants to analyze. In the example the goal of the attack is to open a safe ("open safe"). This is placed as the root node in the attack tree as can be seen in FIG. 1A.

The next step is to figure out how this can be achieved and there could be more than one way. After a thorough analysis of the technical environment and every other relevant aspect, it may be decided that there are only two possible ways of doing this: by cutting the safe open or by opening the lock. These two actions are added as predecessors to the root, as depicted in FIG. 1B.

Now comes the conquer-step: each of the two added nodes is analyzed to establish all possible ways of achieving them. In this case, it is decided that cutting up the safe is simple enough so that it is does not need any further refinement. Here, simple is not the same as easy. Instead, an action is considered simple when it is clear how it is performed, no matter the degree of difficulty. An action that has been refined to a point where no further refinement is needed is called an atomic attack. The other way of opening the safe, by opening the lock, is on the other hand not refined to satisfactory degree. It is therefore further analyzed how this action can be performed, and in this case, it is decided that there are three different ways of doing it: by using a locksmith, by stealing the combination or by eavesdropping to obtain the combination. Thus these three ways are added as predecessors to the "open lock" node, as can be seen in FIG. 1C. Although this example is quite simplified, it should be clear that there is a direct relation between an attack tree and physical/technical influence on the system.

The three nodes are analyzed exactly as above. In the example, it is decided that eavesdropping the combination should be considered to be an atomic attack, whereas using the locksmith can be achieved by convincing him to do it or bribing him to do it.

The third way, eavesdropping the combination, can be achieved only by getting the combination stated in some way while at the same time listening to the conversation. This makes the eavesdropping a so called and-node, as all its predecessors has to be accomplished in order to accomplish the sub-attack that it represents. This contrasts all other nodes discussed this far, which have been or-nodes, i.e., they are nodes that can be accomplished by achieving only one of their direct predecessors. Graphically, an and-node is represented as a box instead of a round shape as is the case for or-nodes, and the arrows going into it have small circles as arrowheads instead of ordinary arrowheads, as in FIG. 2.

At this point it may be decided that there is no more need for refining any attack, i.e., all leaves are considered as being atomic attacks. The attack tree is therefore considered complete, and all our knowledge about the threat is now represented in the tree. The decision about when a node is considered to be of sufficient simplicity to qualify as an atomic attack, is left entirely up to the constructor, and has to be made individually for each tree constructed.

In the example above we only considered a single threat/attack to the technical system. In general there could be a plurality of threats that needs to be understood and this general case will be discussed later.

Attack Tree Analysis

Now that the threat is modeled as an attack tree from a qualitative point of view, it can be used to evaluate or "measure" the security of the technical system at hand in a more quantitative way. This is done by first "rating" the atomic attacks according to some attribute that is sought to evaluate, and then deriving the attribute value for the whole system. This is, as with the construction of an attack tree, best explained by an example.

As an example, suppose that there is interest in whether or not the threat of opening the safe is at all possible to realize, i.e. a "Boolean" attribute.

The first step is to rate the atomic attacks in the tree as whether or not they are possible (under a given set of conditions/assumptions). The result can be seen in FIG. 3, where I stands for Impossible and P stands for Possible. Now, the following, quite natural, two rules are used:
1. An or-node is defined to be possible if, and only if, at least one of its predecessors is possible.
2. An and-node is defined to be possible if, and only if, all its predecessors are possible.

Using these two rules and the assignment of (im)possibilities to each atomic attack, the possibility or impossibility can be derived for each of the non-atomic attacks in the tree in a very simple "bottom-up" way. The result of doing this with the given example is shown in FIG. 4.

As can be seen from FIG. 4, the threat is possible to realize. It is also clear how this threat can be realized: by opening the lock by using a locksmith that is bribed. In the example, this is the only way. In more general cases, the possible realization(s) of the threat can be found in terms of path(s) from the root, where all labels in the path(s) have P-labels. The possibility/impossibility is not the only attribute that is discussed in [11]. Other attributes proposed is the difficulty (e.g. time/skills needed) of the easiest attack, the need for the attacker to use special equipment for all attacks (e.g. all attacks require use of power-drill), the cost (in terms of money/resources) of the cheapest attack, etc. For each of these, the way to derive the value of an or-node and an and-node must be decided in a way that seems reasonable. As an example, the two rules for computing the cost of the cheapest attack, corresponding to the rules above when the possibility was discussed, could be the following, quite natural definitions:
1. The cost of an or-node equals the minimum of the cost of its predecessors
2. The cost of an and-node equals the sum of the cost of its predecessors Using the previous attack tree and instead computing the minimum cost attribute, the resulting tree will look like FIG. 5, given the therein depicted set of costs of the atomic attacks.

Note that the atomic attacks are rated with different sets of initial conditions in these two examples. As an example, the cost of convincing the locksmith is irrelevant when it is impossible. If the initial conditions are indeed the same, then the tree needs pruning of the impossible nodes before a meaningful analysis of other attributes can be performed.

After having derived information about the cost, difficulty and need for special equipment, the overall security of the system can be assessed by considering who the adversary is. If it is some entity with potentially infinite monetary resources but with little knowledge, then it is of course important that the attack is technically hard to realize, but whether it is expensive or not is of little importance. On the other hand, if the adversary is a brilliant computer hacker, then the high cost and the need for some hard-to-get special equipment is important, but the difficulty of breaking in might be of less importance as it is assumed that the hacker can do almost anything possible with a computer. It is when the result of the analysis is combined with the information about the attacker that proper decisions about countermeasures can be made, and this point is heavily emphasized in [11].

It was mentioned at the start of this section that ATs could be of some help in analyzing the threats, and not only in representing the result of the analysis. The idea is that the analyzer of the system gets a way of systematically covering all aspects in depth, and this structured approach could reduce the risk of overseeing a possible threat. Of course, the analysis is always ultimately dependent on the analyzer.

Automation

The above examples can be considered "toy" examples only serving the purpose of explaining how attack trees can be used. In a large, complex technical system the associated attack tree can be quite large, However, as one of ordinary skill in the art can realize, the above discussed methods of traversing the attack tree from leaves to root can easily be automated by an apparatus, thus propagating values upward according to the two rules for "and/or" vertices.

Numerous papers have been published in this field, as well as in other related areas.

In [8], a more formal treatment of attack trees can be found. The authors provide a mathematically rigorous framework for attack trees and the algorithms for propagation and projections described in [11]. However, this theory does not allow for all possible types of (non-tree) graphs, and therefore cannot be used as it is. The very nature of the theory makes it impossible to extend in a straight-forward way, and thus it becomes less interesting.

Attack Graphs

The subject of attack graphs, studied mainly at Camiege Mellon University, bears similarity in the name to attack trees. However, this is where the similarity ends, as the concept differs entirely from attack trees. The aim of attack graphs is to derive, from a model of the system, all the possible attacks on the system and ultimately devise a set of actions to prevent these possibilities. The main method used is to specify the set of safe states S in the network model that satisfies a desired property (capturing that the system is free of security breeches), and then use standard model checking techniques to generate the executions, if any, in the model which reach some state not in S. Since reaching such a state would mean a security breech, the system is secure if no such state can be reached. Put differently, determining if an attack can be mounted is the same as solving a graph reachability problem. Attack graphs have advantages, but also disadvantages compared to attack trees. First, attack graphs are mainly concerned with deducing whether there exists an attack. Attack graphs can be used to find an "optimal" countermeasure that will thwart the attack. Unfortunately, finding this optimal countermeasure resorts to solving NP-complete graph problems, which may be practically infeasible and one would need to settle for an approximately optimal countermeasure. Moreover, "optimal" is only quantified by the number of changes needed in the abstract graph representation of the system. In practice, one may be more interested in the countermeasures that are most practically feasible which could very well be some completely different countermeasures. Other quantitative aspects are not at all taken into account. For more background on attack graphs, see [12].

Augmented Attack Trees

Various extensions have been made to the attack tree concept. In [7, 4], Tidwell et al extends the concept of attack trees with parameters, variables, sub goals and pre- and post conditions. They also introduce the concept of an Elevated Node Topology (ENT), which is a way to hierarchically cluster the nodes in an attack tree. This extension is then used as a part of a system for attack detection, in particular of attacks that consist of several, seemingly unrelated attacks. In [3] the hierarchical clustering is redefined as a Stratified Node topology (SNT), which is essentially the same as an ENT. The additional concept introduced in the SNT is that of implicit and explicit links in the attack tree. The difference between them is that an implicit link is used to describe an event automatically induced by some other event, whereas an explicit link describes the enabling of another attack, which is then not necessarily carried out. In [5], they thoroughly explain how to automatically generate attack trees via the notion of attack tree chaining from descriptions of the system. They also provide a very crude sketch of how to use the generated attack tree to analyze the probability of attacks on the system.

Another way of modeling threats against a system that was inspired by attack trees is the use of Petri Nets instead of just ordinary graphs. A Petri Net is a graph with some extra features: informally, it is a graph accompanied with a function describing the initial state of the Petri Net, and a relation with some additional restrictions describing the possible transitions of the system. The obvious way to visualize this is as a graph with tokens on its vertices, and some rules describing how the tokens move, allowing the number of tokens to vary from the start to the completion of a transition. For a more in-depth introduction of Petri Nets see [6, 15].

The above described research is, albeit intrinsically interesting, not of great use from a practical point of view when it comes to improving the system security. The main reason for it not being relevant is that there is a lot of focus on how to predict attacks from a description of a system, rather than analyzing an existing attack tree. Some of the ideas from Tidwell et al in [4, 5] are interesting and can serve as inspiration for extensions, in particular their discussion on parameters.

The use of Attack Nets as in [9] does indeed provide a more expressive model. In particular, the ability to have more complicated rules than just AND/OR nodes is interesting. However, if the model becomes more complicated the intuitiveness inherent in the simple AND/OR tree structure is lost. The tradeoff here seems too big for the particular application at hand.

Existing Tools

There are already some tools for the analysis of attack trees. Most notably there is the commercial tool called securITree from Amenaza Tech Ltd. The focus of the tool seems to be mainly the usability for people that are not very computer literate. For more information, see [1].

There is also a tool developed by Alexander Opel [10]. This tool contains some basic functionality for constructing attack trees as well as some types of analysis, but does not allow for more general cases. There are also some interesting points made in the report that are relevant in general to the design and implementation.

However, despite a plethora of work in this technical field, there is still a general demand for an efficient apparatus and/or tool for analyzing attacks to more general technical systems (in particular cases that cannot be modeled by trees or very simple graphs) and enabling proper reconfiguration of the technical system under consideration to improve system security.

SUMMARY

There is a general demand for improvements with respect to efficient system reconfiguration based on analysis of attacks on a technical system.

It is an object of the present invention to provide an improved apparatus for reconfiguring a technical system based on analysis of the security of the technical system to obtain improved system security.

It is another object to provide an improved technical decision support system for analyzing the security of a technical system to enable reconfiguration of the technical system for improved system security.

Yet another specific object is to provide a corresponding computer program product for analyzing, when running on a computer system, the security of a technical system to enable reconfiguration of the technical system for improved system security.

These and other objects are met by the invention as defined by the accompanying patent claims.

The inventors have recognized that the state-of-the-art is mainly focused on isolated analysis of individual system configurations and/or actions, or the finding of new attacks to which the technical system under consideration may be vulnerable.

The invention proposes a novel approach for efficient reconfiguration of a technical system based on systematically applying or simulating different sets of countermeasures to a graph representation of potential attacks on the technical system and providing a ranking list based on the effectiveness of the applied countermeasures with respect to the reduction of the risk of attacks. In this way, it is possible to select among the sets of countermeasures having the highest rank (i.e. most effective), and apply an appropriate set of countermeasures to the technical system.

The invention opens up for an automated evaluation and effective comparison of countermeasures that goes far beyond what has been offered by the prior art.

The risk of an attack is typically defined as the expected loss if an attack is realized, and risk reduction is therefore normally related to the reduction of expected loss.

In an exemplary embodiment, the ranking list may be complemented by also considering the cost of the countermeasures so that the effectiveness, or risk reduction, can be assessed in relation to the cost for applying the countermeasures.

It is also possible to use a common reference when comparing different sets of countermeasures in the ranking procedure, e.g. by using the rank of the technical system without any applied countermeasures. This is not necessary, but gives an optional and sometimes preferred indication of the actual degree of improved technical security for the different sets of countermeasures.

In a first aspect of the invention, there is thus provided an apparatus for reconfiguring a technical system based on analysis of the security of the technical system to obtain improved system security. The apparatus basically comprises an input for receiving technical information characterizing the technical system, a graph representation unit for representing security threats, risks or attacks to the technical system, a ranking unit for ranking countermeasures, a countermeasure selector and a system reconfiguration unit. The graph representation unit is configured to provide, based on the received technical information, a representation of potential attacks to the technical system in a directed graph of attack nodes having attributes related to the technical system. The ranking unit is configured to rank a number of different sets of countermeasures to enable a selected set of countermeasures to be taken to improve system security, each set of countermeasures comprising at least one countermeasure. More specifically, the ranking unit is configured to perform the following procedure for each set of countermeasures: i) logically applying the set of countermeasures to attacks in the directed graph, and ii) determining a rank of the applied set of countermeasures based on the effectiveness of the applied set of countermeasures with respect to reduction of the risk of attacks. The selector is configured to select among the sets of countermeasures having the highest rank, and the system reconfiguration unit is configured to apply a selected set of countermeasures to the technical system.

It should be clear that the control and/or decision outcome directly correspond to physical/technical influences on the technical system under consideration.

In a second aspect of the invention, there is provided a technical decision support system. Basically, the technical decision support system is configured for analyzing the security of a technical system to enable reconfiguration of the technical system for improved system security. The technical decision support system preferably comprises means for receiving technical information characterizing the technical system, and means for providing, based on the received technical information, a representation of potential attacks to the technical system in a directed graph of attack nodes having attributes related to the technical system. The technical decision support system further comprises means for ranking a number of different sets of countermeasures to enable a selected set of countermeasures to be taken to improve system security. Each set of countermeasures comprises at least one countermeasure, and the ranking means is configured to perform the following procedure for each set of countermeasures: i) logically applying the set of countermeasures to attacks in the directed graph, and ii) determining a rank of the applied set of countermeasures based on the effectiveness of the applied set of countermeasures with respect to reduction of the risk of attacks. This provides technical decision support information for an operator or an automated system to enable well-founded selection of efficient countermeasures.

In a third aspect of the invention, a corresponding computer program product to be used in a technical apparatus or decision support system for security analysis.

BRIEF DESCRIPTION OF THE DRAWINGS

The invention, together with further objects and advantages thereof, will be best understood by reference to the following description taken together with the accompanying drawings, in which.

DETAILED DESCRIPTION

Figure 1C:
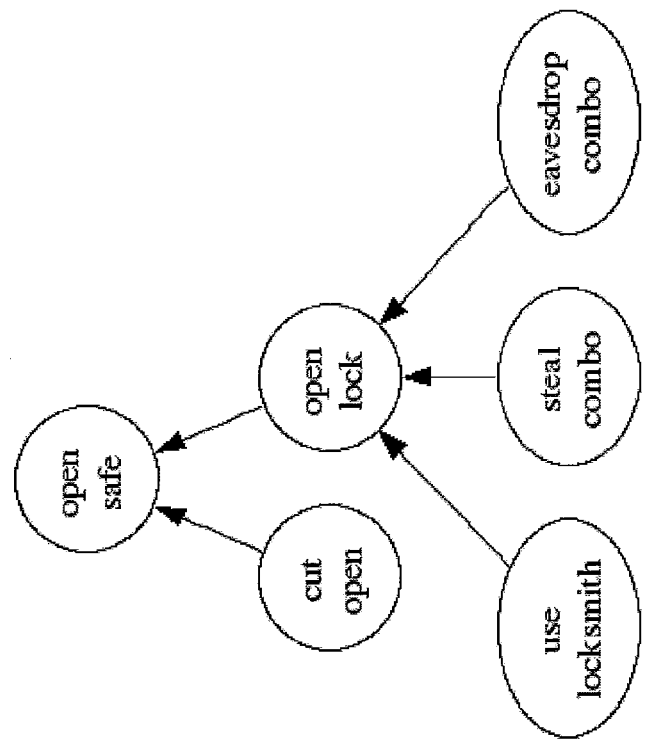
FIG. 1C is a schematic diagram illustrating an example of a third level involving three predecessors to the attack "open lock" of FIG. 1B.
Figure 1B:
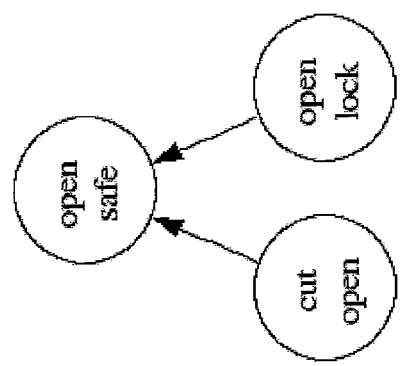
FIG. 1B is a schematic diagram illustrating two attack nodes, in this particular example representing two ways of opening a safe.
Figure 1A:
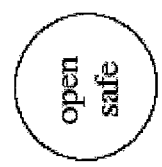
FIG. 1A is a schematic diagram of a root node according to an illustrative example.
Figure 2:
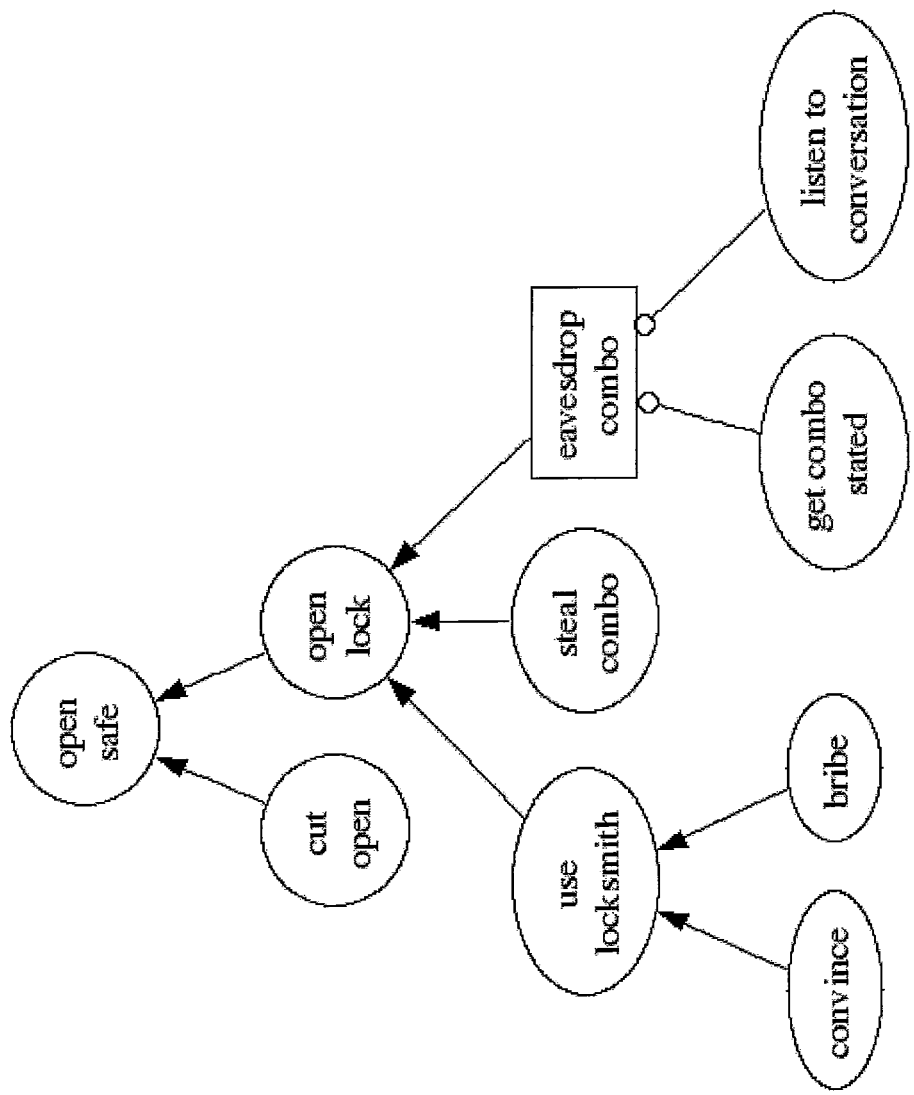
FIG. 2 is a schematic diagram illustrating an example of a fourth level, and the introduction of an and-node on the third level.
Figure 3:
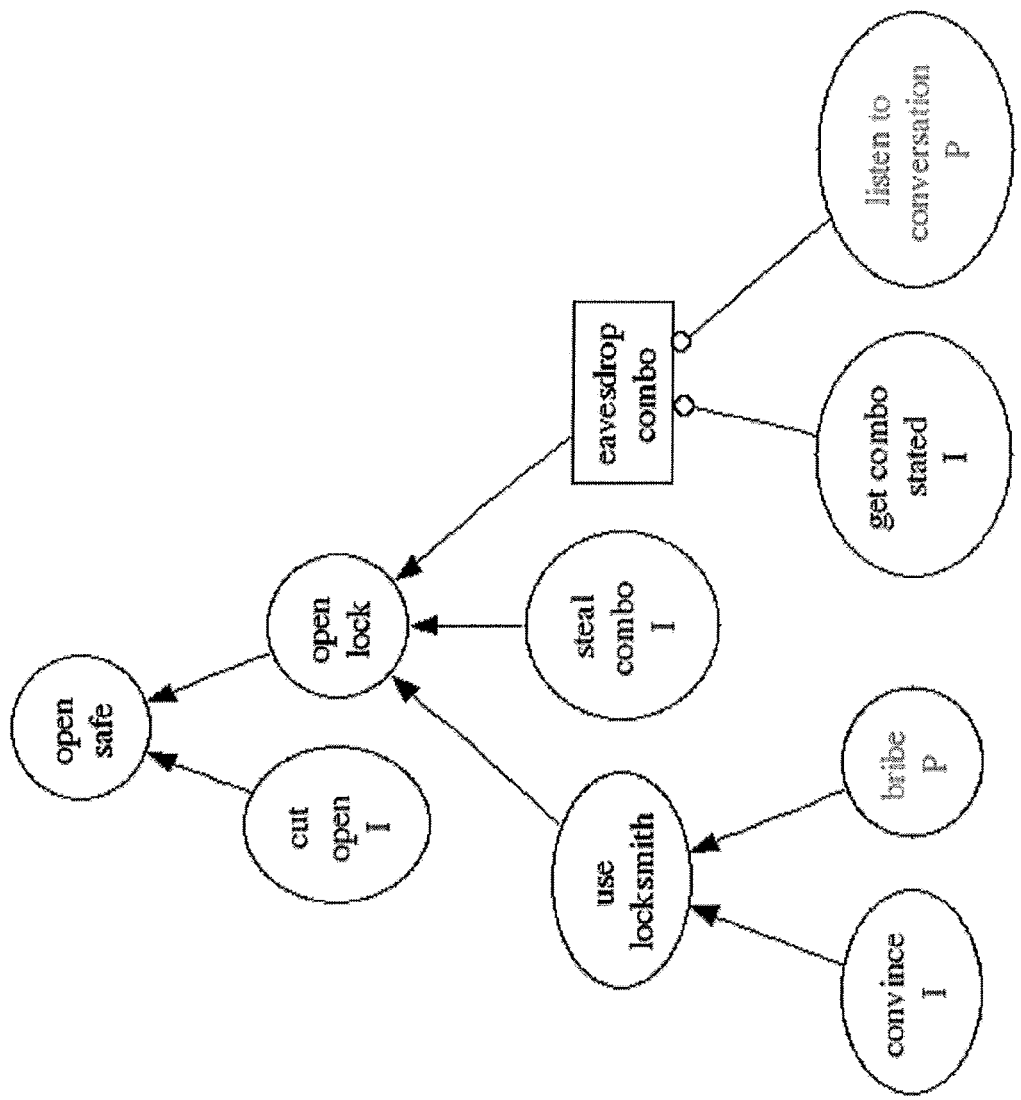
FIG. 3 is a schematic diagram illustrating an exemplary way of rating so-called atomic attacks in the previous example of FIG. 2.
Figure 4:
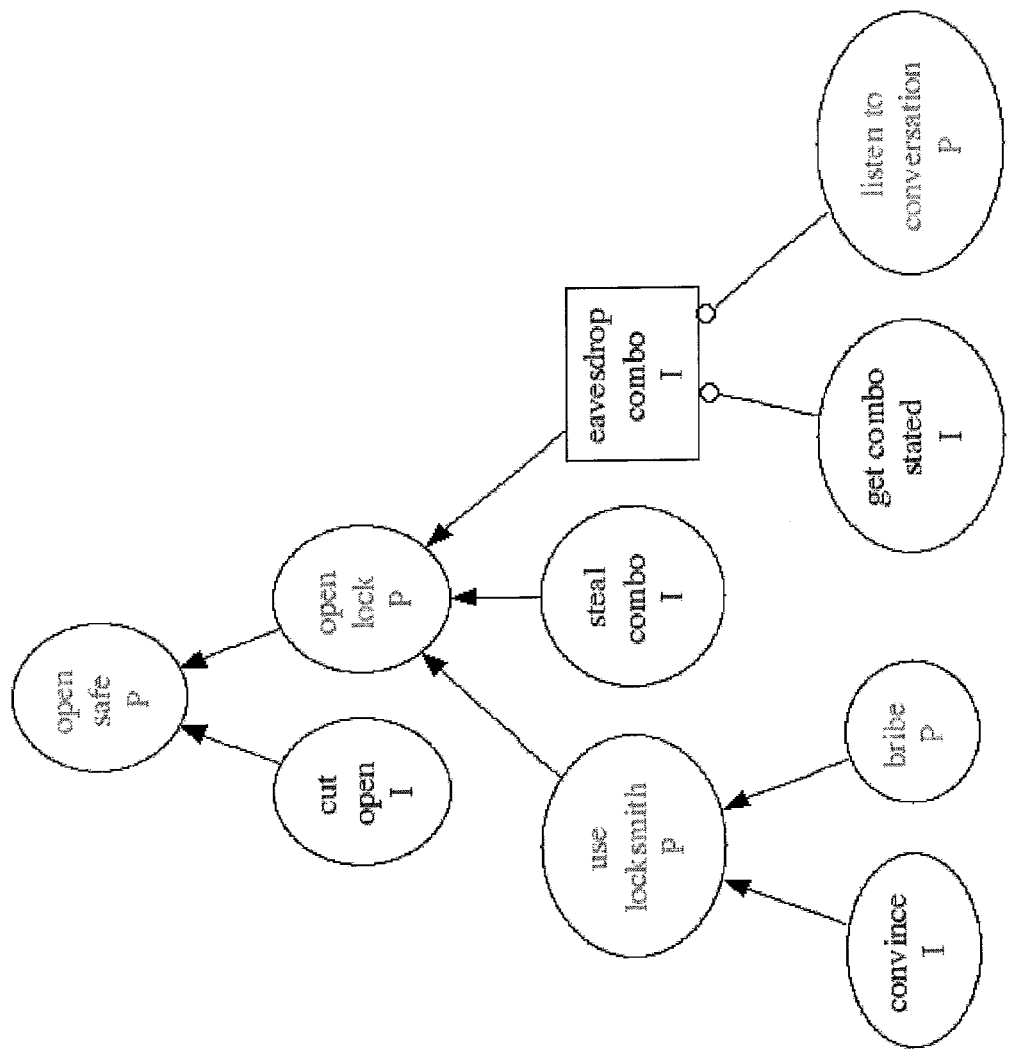
FIG. 4 is a schematic diagram illustrating derived values for all attack nodes corresponding to the example of FIG. 3 after propagation.
Figure 5:
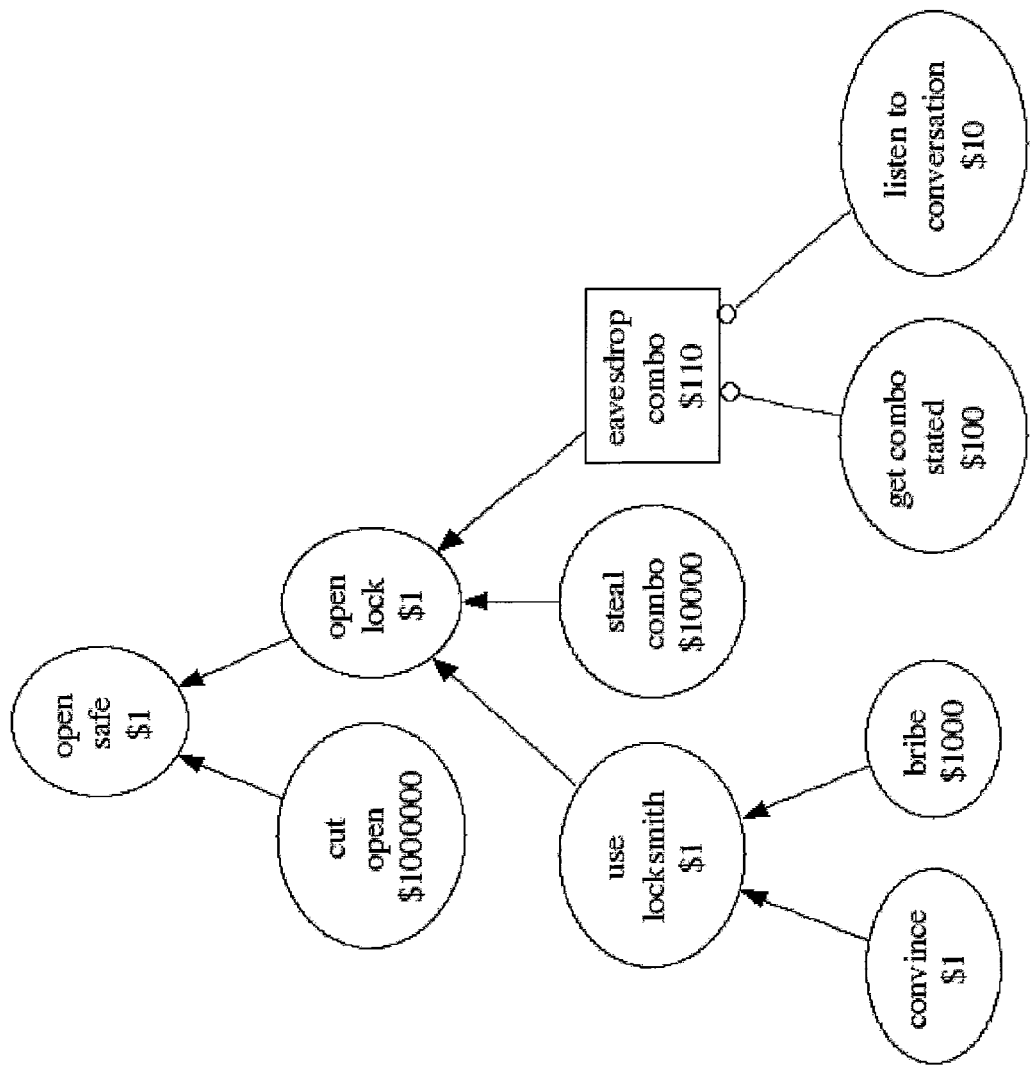
FIG. 5 is a schematic diagram illustrating another exemplary way of rating so-called atomic attacks in the previous example of FIG. 2, as well as derived values for all nodes after propagation.

Throughout the drawings, the same reference characters will be used for corresponding or similar elements.

The inventors have recognized that an important goal of a security analysis is first of all to understand how and to what extent it is possible to technically act on the system(s) under consideration to compromise the security of the technical systems, i.e. what vulnerabilities and threats there are. A second goal is to understand how to (re)configure the technical systems in order to reduce the risk of a compromise, i.e. to understand which countermeasures are most effective. The risk associated with a threat is often defined as the expected loss of the threat being realized. Clearly, a countermeasure that is more "expensive" than the risk-reduction it gives is not very efficient in an absolute sense and two different countermeasures could have quite different cost/risk-reduction ratios, a smaller such ratio usually being preferred.

When investigating the previous work in the field, it also becomes clear that some additional issues have not been satisfactorily explored. There are at least three other aspects that have not been thoroughly examined and solved.

Overestimation of the Minimum Cost

In [11], the attack tree is constructed in a pure top-down divide-and-conquer approach. If an attack occurs more than once in the tree, it is modeled twice as separate nodes. This is not necessarily a problem, but to get a clearer overview of the threat it might be considered more natural to have only one node for each sub-attack. This would turn the tree into what is called a Single-Sink Directed Acyclic Graph (SSDAG). It would clearly still give the same result while performing the computations as described earlier, which might be a problem.

Figure 6:
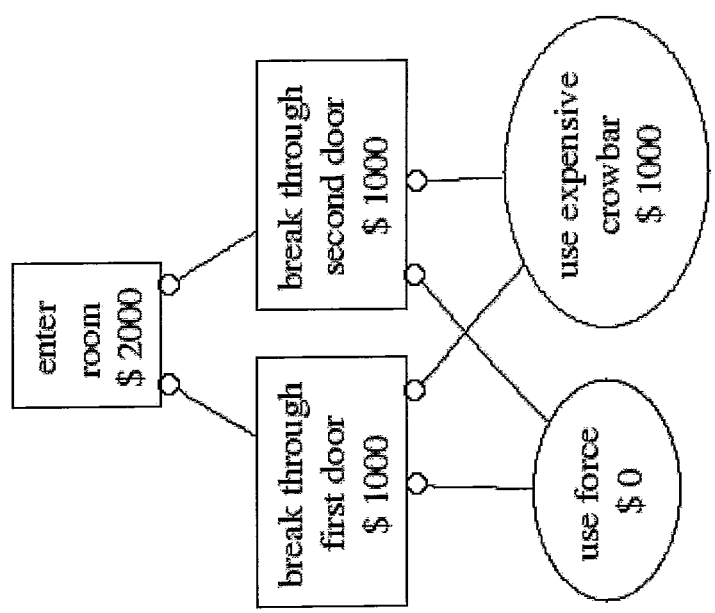
FIG. 6 is a schematic tree illustrating an example of calculating the minimum cost of breaking into a room.

Suppose that the aim is to model the threat of someone breaking into a specific room. The only way of doing that is by going through two doors, where each door has to be forced through using a crowbar. The resulting tree and the calculated minimum cost are shown in FIG. 6.

Note that the minimum cost has been overestimated, and yet there is no flaw in the modeling. This is indeed a problem, and the reason for this is the different nature of the question of minimum cost compared to the question of minimum difficulty, possibility or whether a property is needed for all attacks.

Multiple Sinks

Figure 7B:
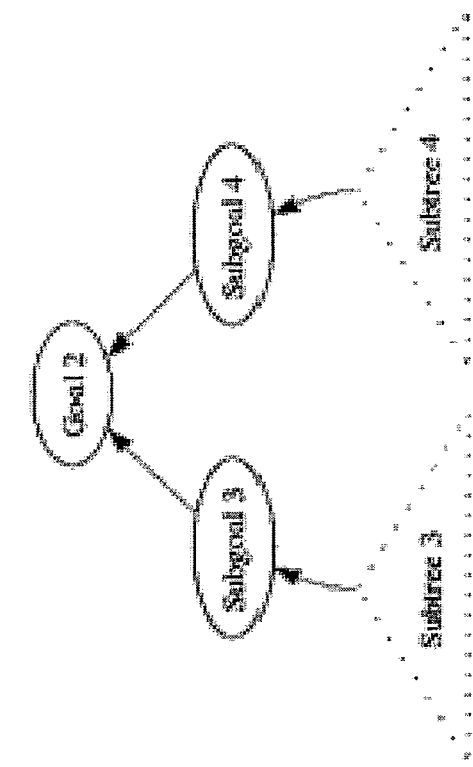
FIGS. 7A-B schematically illustrate two Single-Sink Directed Acyclic Graphs (SSDAGs) describing different threats to the same system.
Figure 7A:
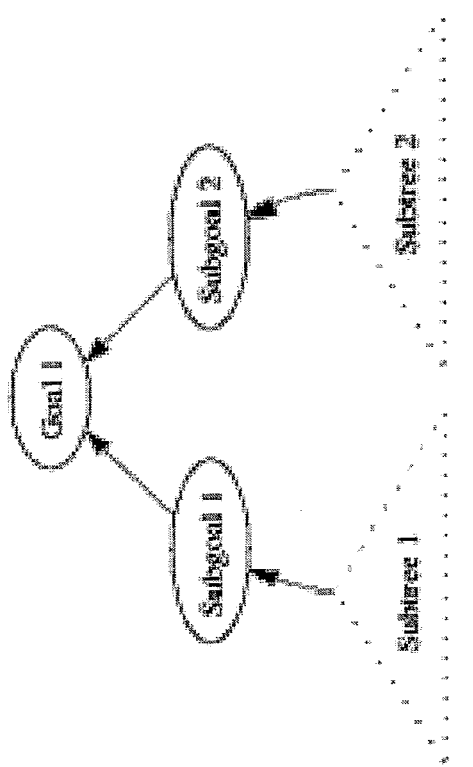

A valid question to ask is whether there is any reason for having only one sink. Suppose that there are two attack-SSDAGs describing different threats to the same system, as depicted in FIGS. 7A-B.

Also assume that the two sub-threats 2 and 3 are actually the same sub-threat. As the SSDAGs are constructed with the same initial state in mind, the two sub-trees 2 and 3 must be equal. In this case, it might therefore give a better or more complete view of the system, if we combine the two SSDAGs of FIGS. 7A-B into one big DAG, as in FIG. 8.

An interesting question that can be addressed here is whether or not the calculation of properties can be carried out in the same way as before if we do this, or if this approach introduces some new problems.

Reusable Attacks

Figure 8:
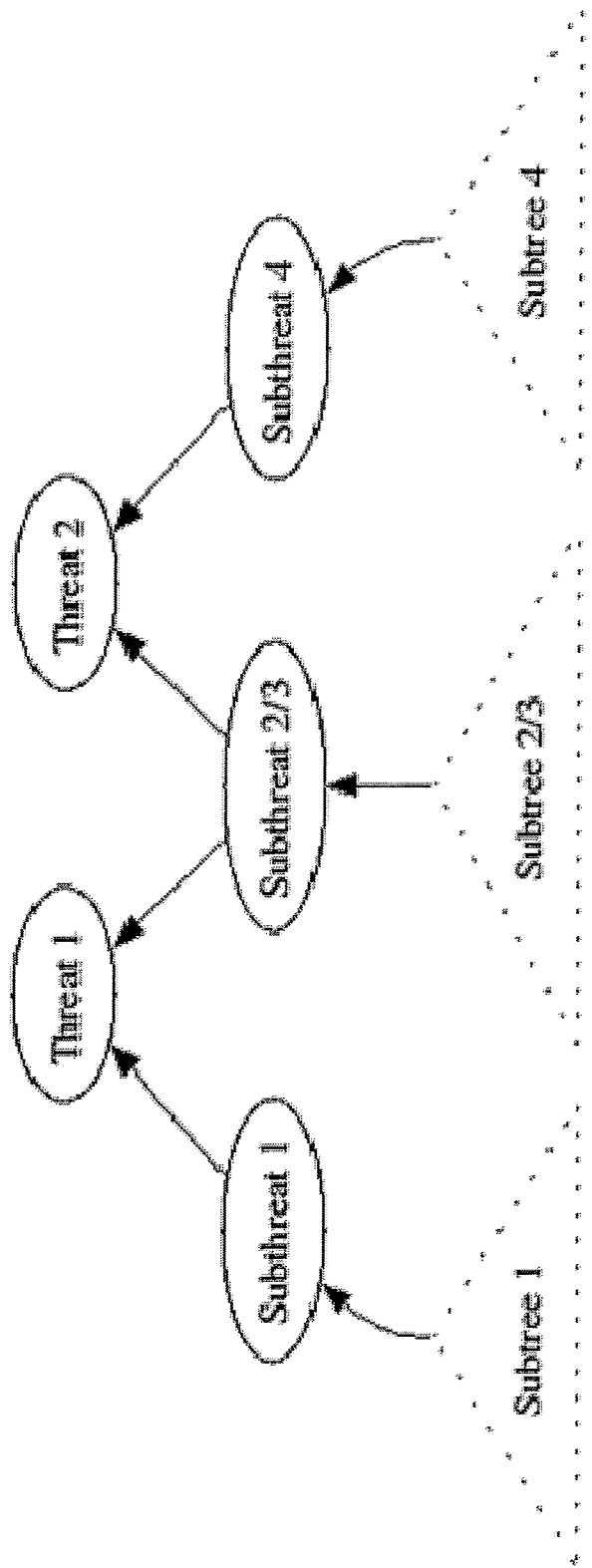
FIG. 8 schematically illustrates a combined Directed Acyclic Graph (DAG) resulting from the two SSDAGs of FIGS. 7A-B.

As seen in FIG. 8, sub-threat (or sub-attack) 2/3 is common to the realization of Threat 1 and Threat 2. Suppose that the effort spent (by the attacker) in realizing subthreat 2/3 is a "stepping-stone" both towards Threat 1 and Threat 2, i.e. that the associated attack can be reused twice (or more) and will eventually realize both Threat 1 and Threat 2. Then the cost/time/complexity of performing this sub-attack can be "amortized" over all end-goals that the attacker could reach by performing it. I.e. though the sub-attack itself might at first look too costly to perform, the fact that it can be reused needs to be considered to understand the overall system's security. The concept of reusable attacks is not well handled by prior art.

Cycles

In a small note in [13], a comment in [9] and a brief comment in [3], the notion of cycles in an AT is discussed. There is no thorough investigation of the subject how to handle cycles.

The improved security method and system of the invention overcomes the prior-art limitations discussed above and provides for efficient countermeasures based on security analysis of even very complex technical systems and enables improved secure system operation. The invention serves as a support for analyzing and making decisions with respect to security threats to a technical system or corresponding technical process and provides for technically affecting the system by reconfiguration.

The invention basically provides an input for receiving technical information characterizing the technical system, a graph representation unit for representing attacks, and a ranking unit for ranking countermeasures.

The graph representation unit is configured to provide, based on the received technical information, a representation of potential attacks to the technical system in a directed graph of attack nodes having attributes related to the technical system. The ranking unit is configured to rank a number of different sets of countermeasures to enable a selected set of countermeasures to be taken to improve system security, each set of countermeasures comprising at least one countermeasure. More specifically, the ranking unit is configured to perform the following procedure for each set of countermeasures: i) logically applying the set of countermeasures to attacks in the directed graph, and ii) determining a rank of the applied set of countermeasures based on the effectiveness of the applied set of countermeasures with respect to the reduction of the risk of attacks.

In a first aspect, the invention is realized as an apparatus for analysis and system reconfiguration that further comprises a selector configured to select among the sets of countermeasures having the highest rank, and a system reconfiguration unit configured to apply a selected set of countermeasures to the technical system. In general, the highest rank corresponds to the most effective or efficient set of countermeasures.

In a second aspect, the invention is realized as a technical decision support system for enabling proper reconfiguration of the technical system based on the ranking of countermeasures.

In a third aspect of the invention, the invention is realized as a computer program product which, when running on a computer, can be used in a technical apparatus or decision support system for enabling reconfiguration of the technical system based on security analysis.

The above interrelated aspects of the invention will be described in greater detail later on.

Examples of technical systems can be found in different fields of technology, including industrial automation systems, information/communication systems and transportation systems. In particular, the invention is applicable for analyzing attacks on a communication network having a number of communication units interconnected by communication links, wherein at least some communication units and/or links are vulnerable to attacks. The communication network could for example be a server-based network forming part of the Internet, or a wireless network such as a modern radio communication network.

The countermeasures will of course vary according to the technical system being considered. As should be understood by the skilled person, different types of countermeasures will normally be applied to different types of technical systems. For example, industrial automation systems on one hand and mobile communication systems on the other hand are normally subject to completely different types of security threats, and accordingly the countermeasures will differ for different systems. This is a main reason for not going into too many details regarding the exact nature of the threats and countermeasures, since these will ultimately depend on the technical system being considered and the particular security threats being imposed onto the system. However, some illustrative examples of attacks and countermeasures will be given in the following description. Several of these examples are taken from the data/telecom technical field. Other examples, e.g. from the aerospace field can be found in e.g. [13]. Other examples can also be found in [18].

Anyway, the term "countermeasure" should be interpreted quite broadly and generically as any measure to a technical system that counters or improves the security of the system.

In the literature, a countermeasure has been defined as an action, device, procedure, or technique that reduces a threat, a vulnerability, or an attack, for example by eliminating or preventing it, or by minimizing or at least reducing it.

The term security attack should be interpreted as any attack effectuating a compromise of the desired security of the technical system.

The reason that it is desirable to keep the system secure and free of successful attacks is that attacks have an undesired effect of the systems operation (performance, availability, etc), which in turn may have direct or indirect effects such as lost revenue, "bad-will", and so forth. A realized threat/attack therefore has an associated cost for the operator/owner of the technical system. A common way to measure the "severity" of attacks is by using the associated risk of the attack, usually defined as the expected loss (in performance, revenue, etc) due to the attack occurring. This measure therefore takes into account both how likely it is that an attack will be realized, as well as the cost or loss, if the attack indeed is realized. The cost can for example be related to the degree or amount of technical resources and/or time required to recover, reconfigure or otherwise perform changes to the system due to the attack(s).

As already described, the invention uses a graph representation of attacks to the system in order to analyze the security of the system. However, in order to capture certain aspects of threats and attacks to technical systems that cannot be captured in prior arts such as attack trees and attack graphs, we use a graph representation called attack jungle. The definition of attack jungle and what aspects that can be better captured in this new representation will be described in more detail later.

First however, recall that a graph may or may not be connected. In particular, this will apply to attack jungles in the most general case. That is, given two nodes of the graph, u and v, there may or may not be a path of edges connecting u and v, even if the graph is not directed. If the graph is not connected, the present invention may be applied to each connected component independently. Alternatively, when evaluating threats/countermeasures, the invention may be applied to rank and evaluate countermeasures by considering e.g. the total effect (security improvement) of a countermeasure computed e.g. as a sum over all connected components of the graph to which the countermeasure is applied. When the attack jungle is corresponding to a complex technical system it may similarly be of interest to only study a sub-graph of the overall attack jungle, e.g. corresponding to a sub-system of the technical system. The directed graph may thus also be a sub-graph of a larger overall graph of attack nodes, in general with or without any direct connection to other parts of the overall graph. The invention is then applied to said sub-graph only.

With this in mind, we in the sequel do not need to be concerned with whether the attack jungle and associated graph is only a part of larger system and its associated attack jungle, whether it is connected or not, since the description will enable one of skill in the art to realize how to apply the invention also in the most general case.

In summary, as will be explained later on, an attack jungle is a more flexible form of representing security attacks or threats in a directed graph of attack nodes.

In an exemplary embodiment, a basic procedure is to obtain a representation of the system vulnerabilities or security attacks in a directed graph with attack nodes, having attributes related to the technical system, apply zero or more countermeasures to the security attacks in the graph, convert the graph to one or more equation systems and associate attribute values with so-called leaf-nodes, solve the associated equation system(s) and extract attribute values to compute a rank of the applied countermeasure(s).

In a particular exemplary embodiment, the security analysis is performed without applying any countermeasures in the analysis phase to simply obtain information about the operational status of the system with respect to security and system vulnerabilities.

This could e.g. be used as a reference or "benchmark" when ranking different sets or combinations of countermeasures.

In a preferred, exemplary embodiment of the invention, the idea is to compare different sets or combinations of countermeasure(s) that can be applied to a system to counter security threats to the technical system, and allowing a selection of the most "efficient" countermeasures. What is meant by "efficient" can be chosen as an input attribute or parameter (it could be cost, how well the countermeasure counters a threat, risk-reduction, and so on). Primarily, the invention considers the effectiveness of applied countermeasures with respect to the reduction of the risk of attacks, so-called risk-reduction.

The attributes associated with the nodes in the graph may for example be feasibility, efficiency, difficulty, cost of the attacks and so forth.

Preferably, the graph has additional indications as to which attack nodes are nodes that require all sub-attack nodes to be performed in order for the "main" attack of the considered attack node to be executable.

Figure 9:
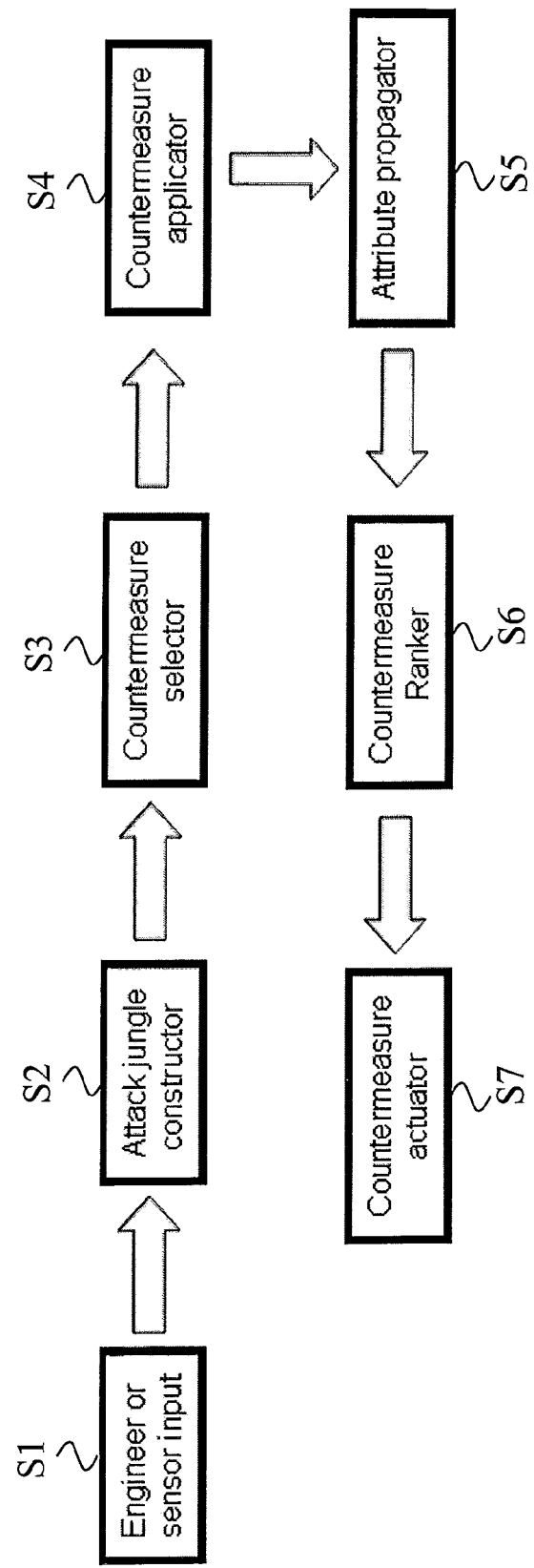
FIG. 9 is a schematic flow-diagram in a decision support system/computer program product implementing a possible exemplary embodiment of the invention.

A flow-chart for a possible technical decision support system and corresponding computer program product that implements an exemplary embodiment of the invention is shown in FIG. 9. This process and the different steps of it can be mapped to a technical apparatus as will be discussed further below, but we first concentrate on the analysis process as such.

Input S1 to generate a so-called attack jungle is produced by an engineer and/or comes from sensors collecting information from the system and its operational state/current configuration. In a particular example, sensors could for instance report information such as: system software version, whether or not encryption is enabled, which cryptographic keys are currently in use, which other network communication units that have made connection to the system, etc. This input is given to the "attack jungle constructor" S2, also referred to as a graph representation unit or a constructor for short, which builds a representation of an attack jungle for the system. In short, the attack jungle can be seen as a directed graph of nodes representing security attacks. Detailed definitions of an attack jungle will be exemplified later on. The countermeasure selector selects S3 zero or more countermeasures from a pre-defined set of possible countermeasures. The countermeasure applicator, logically applies S4 the representation of the countermeasures selected to the attack jungle, e.g., by marking certain attacks as being impossible to perform after the application of the countermeasure (i.e. a sort of simulation of how the countermeasures would work, if deployed in the technical system). In an exemplary embodiment, the attribute propagator preferably propagates S5 the attribute values from the leaf-attacks to the rest of the attacks in the attack jungle for each countermeasure selected (and possibly also for the case where no countermeasure has been applied). In an exemplary embodiment, the rank of a set of or a single countermeasure is thereby typically derived S6 as a function of the attribute values of the sinks in the attack jungle. The rank for a countermeasure may for instance be the vector of the attribute values of all the sinks (since there may in general be a plurality of sinks corresponding to a plurality of attack goals).

The countermeasure ranker lists the countermeasures according to some order defining the effectiveness of the countermeasures with respect to risk reduction and presents the results to the countermeasure actuator.

The countermeasure actuator S7 is responsible for deciding if, and what, countermeasure(s) shall be applied, and to actually apply them by re-configuring the system. For example, in a data or communication system, this means that it may change filtering policies in firewalls, remove a virus, distribute new software patches, revoke cryptographic keys, disconnecting (or putting in quarantine) network units from the system etc. The actuator may instead of applying the countermeasures, display them via a user interface to an operator/engineer that takes appropriate action to apply the countermeasures to the system by manual configuration.

The effectiveness of a countermeasure can be expressed in terms of the reduced risk of one or more threats or attacks being realized.

The risk associated with one or more threats or attacks may be defined as the expected loss. The former is usually of more use since it is more informative and also gives us a chance to evaluate the efficiency of a given set of countermeasures in relation to the cost of applying the countermeasures. The risk of an attack may therefore, as an example, be expressed as the product of the probability of the attack being realized and the loss if the attack is realized:

$$risk = probability \cdot loss.$$

If the probability of an attack is 90% under certain circumstances in a given technical system, and the loss if the attack is successfully realized is valued to let us say 10 000 $, then the risk or expected loss can be expressed as 9 000 $. It should be understood that the loss/cost is generally a loss/cost that corresponds to technical features such as reduced system performance, system capacity, reduced system availability, and so forth. If desired these technical losses can be translated to or valued in money for a better hands-on feeling.

Re-using the above example, if a countermeasure or a given combination of countermeasures reduces the probability of the attack to 50% then the expected loss will be reduced from 9 000 $ to 5 000 $, i.e. a gain or risk reduction of 4 000 $. If the cost for applying the countermeasure(s) is less than 4 000 $ it can be seen that there will be a real value of applying the countermeasure(s). As previously mentioned, a countermeasure that is more "expensive" than the risk-reduction it gives is not very efficient in an absolute sense and two different countermeasures could have quite different cost/risk-reduction ratios, a smaller such ratio usually being preferred.

A non-limiting illustrative example of risk and cost parameters for a number of sets of countermeasures according to an exemplary embodiment of the invention is given below in Table I:

TABLE I

| Set of counter-measures | Reduced risk probability (percentage) | Reduced risk (reduced loss) | Cost for countermeasures | Cost/reduced-risk ratio |
| --- | --- | --- | --- | --- |
| #1 | 100% | 10 000 | 25 000 | 2.50 |
| #2 | 85% | 8 500 | 3 400 | 0.40 |
| #3 | 40% | 4 000 | 2 000 | 0.50 |
| #4 | 5% | 500 | 1 200 | 2.40 |
| ... | | | | |

Based on a table of risk and cost parameters such as Table I, a ranking list can be provided, a first example of which is illustrated in Table II below:

TABLE II

| Ranking | Set of countermeasures |
| --- | --- |
| 1 | #1 |
| 2 | #2 |
| 3 | #3 |
| 4 | #4 |
| ... | ... |

In Table II the ranking is based on the reduced risk of Table I without any consideration to the cost for applying the countermeasures.

Table III below is a second example of a ranking list that is based on the cost/risk-reduction ratio of Table I.

TABLE III

| Ranking | Set of countermeasures |
| --- | --- |
| 1 | #2 |
| 2 | #3 |
| 3 | #4 |
| 4 | #1 |
| ... | ... |

The ranking lists proposed by the invention give very useful and practical information as to which countermeasures to apply in order to eliminate threats or attacks or at least reduce the consequences of such attacks on the technical system. As can be seen, the efficiency can be expressed in different ways, for example as reduced risk or as a cost/reduced-risk ratio (which is also based on the reduced risk). Although the set of countermeasures denoted #1 completely eliminates the risk for an attack, the cost for applying these countermeasures may be greater than the expected gain, and it may be desirable to take this fact into account when providing the ranking list. Anyway, the invention opens up for an automated evaluation and effective comparison of countermeasures that goes far beyond what has been offered by the prior art.

Figure 10:
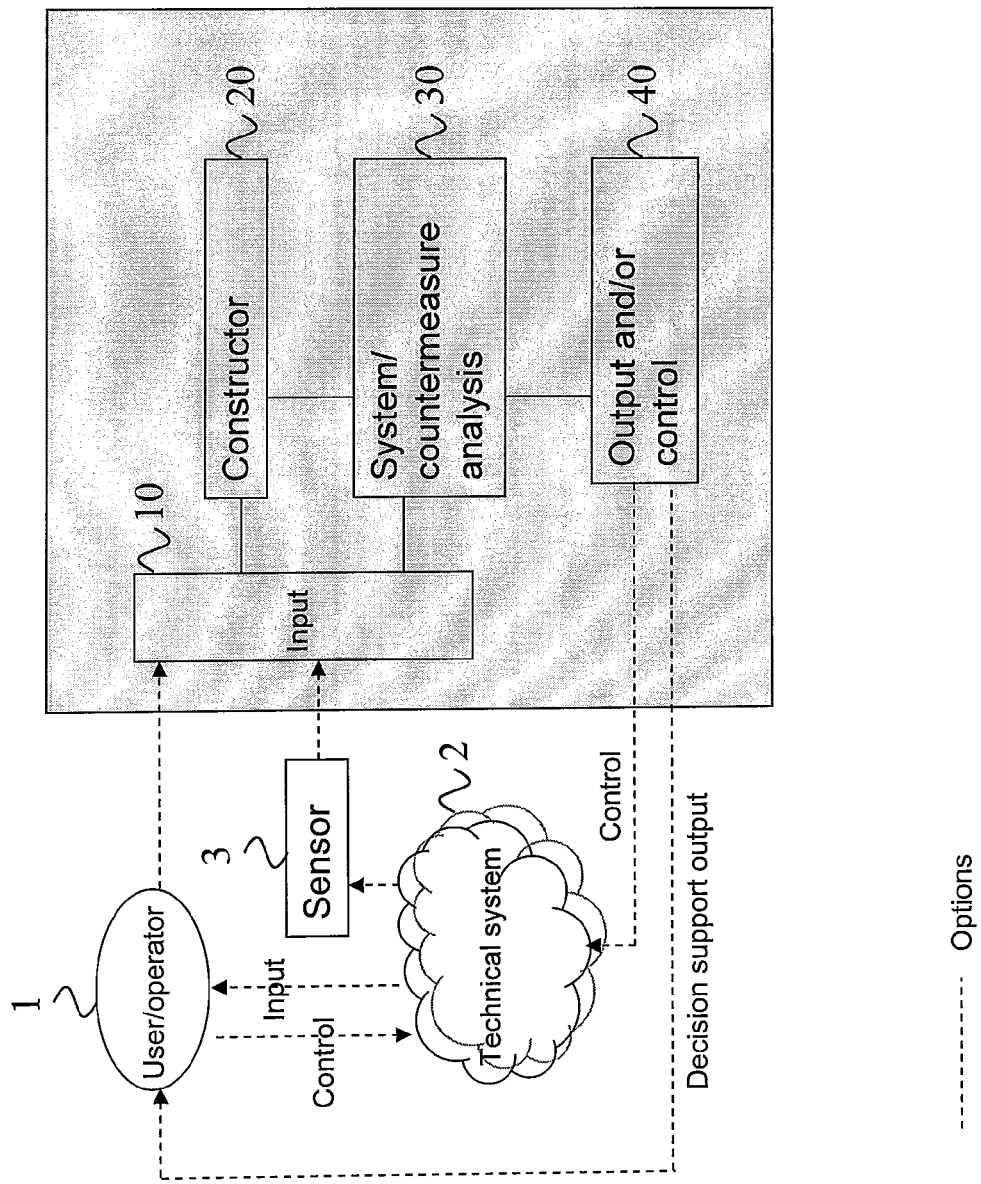
FIG. 10 schematically illustrates a general example of an apparatus or decision support system according to a preferred exemplary embodiment.

FIG. 10 illustrates a general example of an apparatus or decision support system according to a preferred exemplary embodiment.

Basically the apparatus for security analysis comprises an input unit 10, an attack jungle constructor or constructor 20 for short, a unit 30 for system/countermeasure analysis and an output/control unit 40. The input unit 10 may receive information from a user/operator (engineer) 1 having knowledge about the technical system 2 under analysis. Alternatively, or as a complement, sensor(s) 3 may be applied to the technical system 2 for extracting information about the technical system, and forward suitable representations of this information to the input unit 10. In this example, the input may also include attribute values associated with atomic attacks, i.e. those that will be associated with leaf-nodes in the attack jungle representation. Alternatively, or as a complement, a more or less automated assigner (not shown in FIG. 10) may assign values to a suitable subset of attributes. Generally, there is some mechanism for providing attribute values. The constructor 20 generates a graph representation of the security attacks (typically including attribute assignment to leaves), and a system/countermeasure analysis is then performed by the analysis unit 30. It is possible to perform a system analysis based on the graph representation to obtain information about the operational security status of the technical system. Alternatively, or preferably as a complement, it is possible to logically apply a set of one or more countermeasures to the graph representation and perform an analysis of the risk-reduction of the countermeasure(s) (before actually applying them to the real technical system). The output/control unit 40 may then provide technical decision support information as output to the user/operator 1, which may then decide on and implement suitable countermeasure(s) if such measures are needed. Alternatively, or as a complement, the output/control unit 40 provides control information for controlling and/or reconfiguring the technical system 2 from a security point of view.

Figure 11:
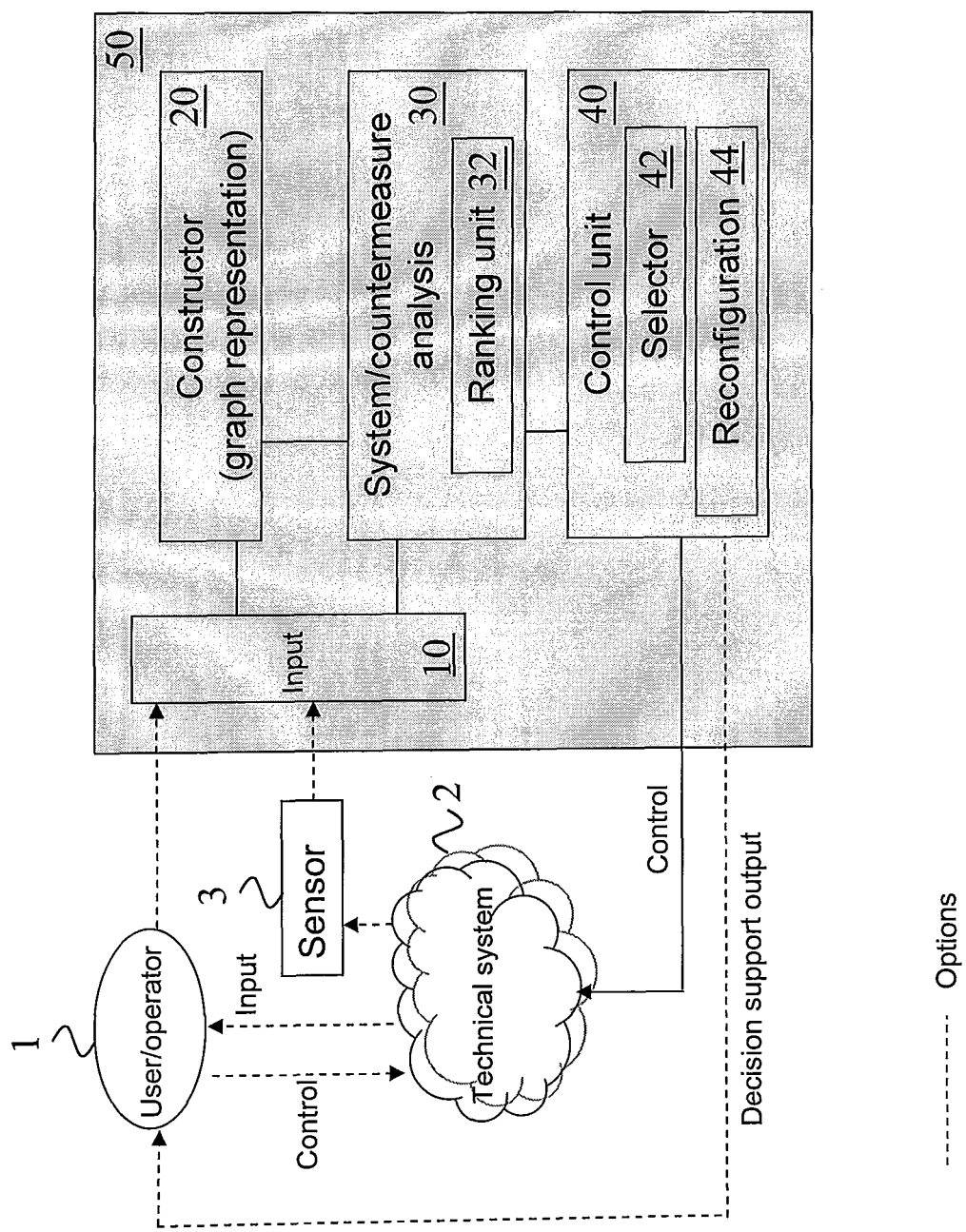
FIG. 11 is a schematic block diagram of an apparatus for analyzing the security of a technical system and reconfiguring the technical system according to an exemplary embodiment of the invention.

FIG. 11 is a schematic block diagram of an apparatus 50 for analyzing the security of a technical system and reconfiguring the technical system according to an exemplary embodiment of the invention. In this particular exemplary embodiment, the constructor 20 provides a representation of potential security attacks to the technical system in a directed graph of attack nodes having attributes related to the technical system. Here, the system/countermeasure analysis unit 30 includes a ranking unit 32 which is configured to rank a number of different sets or combinations of countermeasures to enable a selected set of countermeasures to be taken to improve system security. Each set or combination of countermeasures generally includes at least one countermeasure. The ranking unit 32 is configured to, for each set of countermeasures, logically apply the set of countermeasures to security attacks in the directed graph and determine a rank of the applied set of countermeasures based on the risk-reduction of the applied set of countermeasures. In this embodiment, the output/control unit 40 is implemented as a control unit having a selector 42 and a reconfiguration unit 44. The selector 42 is configured to select among the sets of countermeasures having the highest rank, and the system reconfiguration unit 44 is configured to apply a selected set of countermeasures to the technical system 2, e.g. by means of appropriate control mechanism. In the embodiment of FIG. 11 it also possible, as an option, to provide decision support output to the user/operator 1, which may provide optional control input to the technical system 2.

Figure 12:
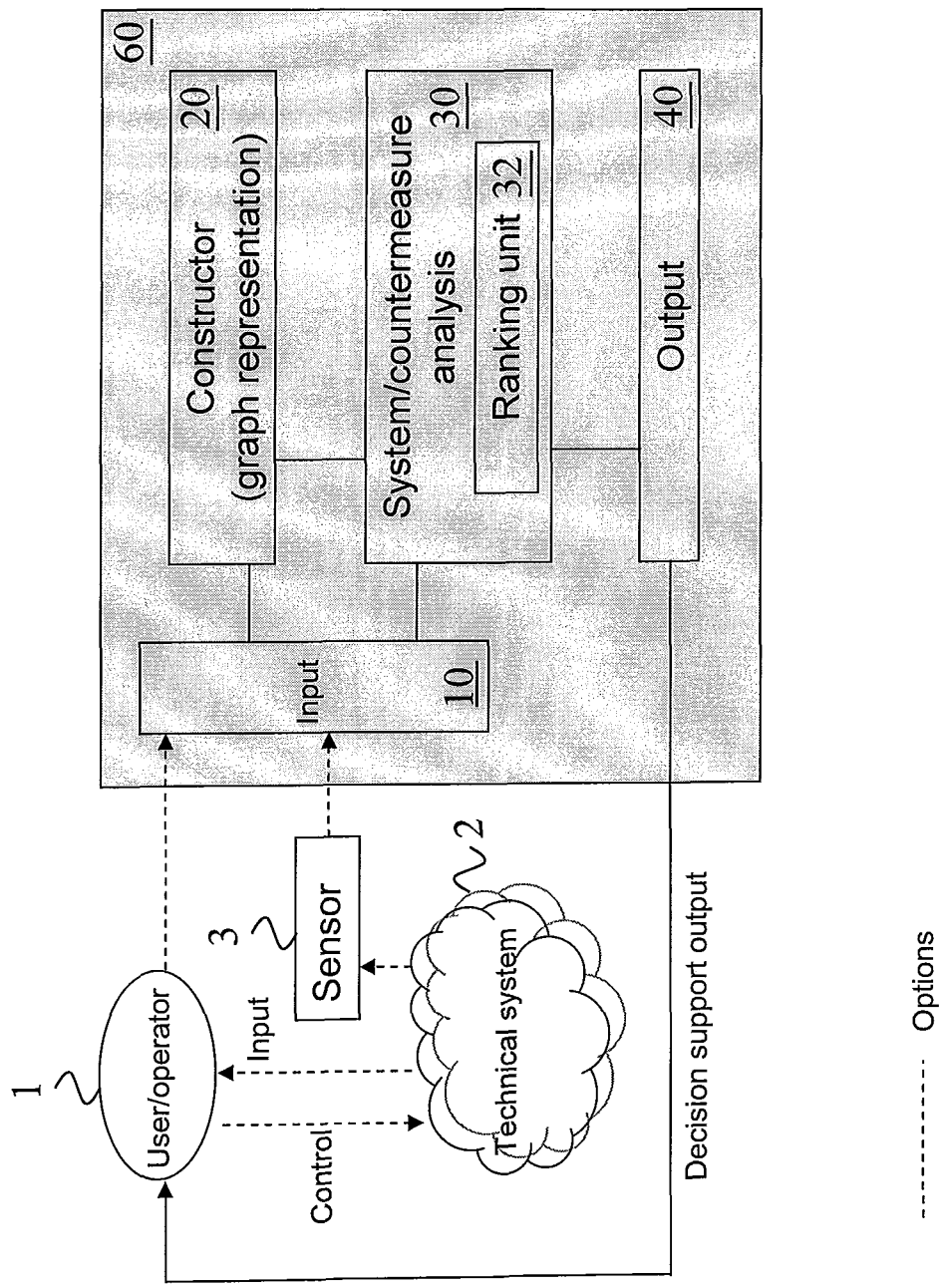
FIG. 12 is a schematic block diagram of a technical decision support system for analyzing the security of a technical system to enable reconfiguration of the technical system according to an exemplary embodiment of the invention.

FIG. 12 is a schematic block diagram of a technical decision support system 60 for analyzing the security of a technical system to enable reconfiguration of the technical system according to an exemplary embodiment of the invention. In this embodiment, the output/control unit is realized as an output unit 40 for providing decision support information, preferably in the form of a ranking list from the ranking unit 32, or alternatively or as a complement, in the form of decision support information that is based on the ranking of different countermeasures. The decision support output is technical information that enables the user/operator to take appropriate countermeasures or actions to improve the security of the technical system 2.

Figure 13:
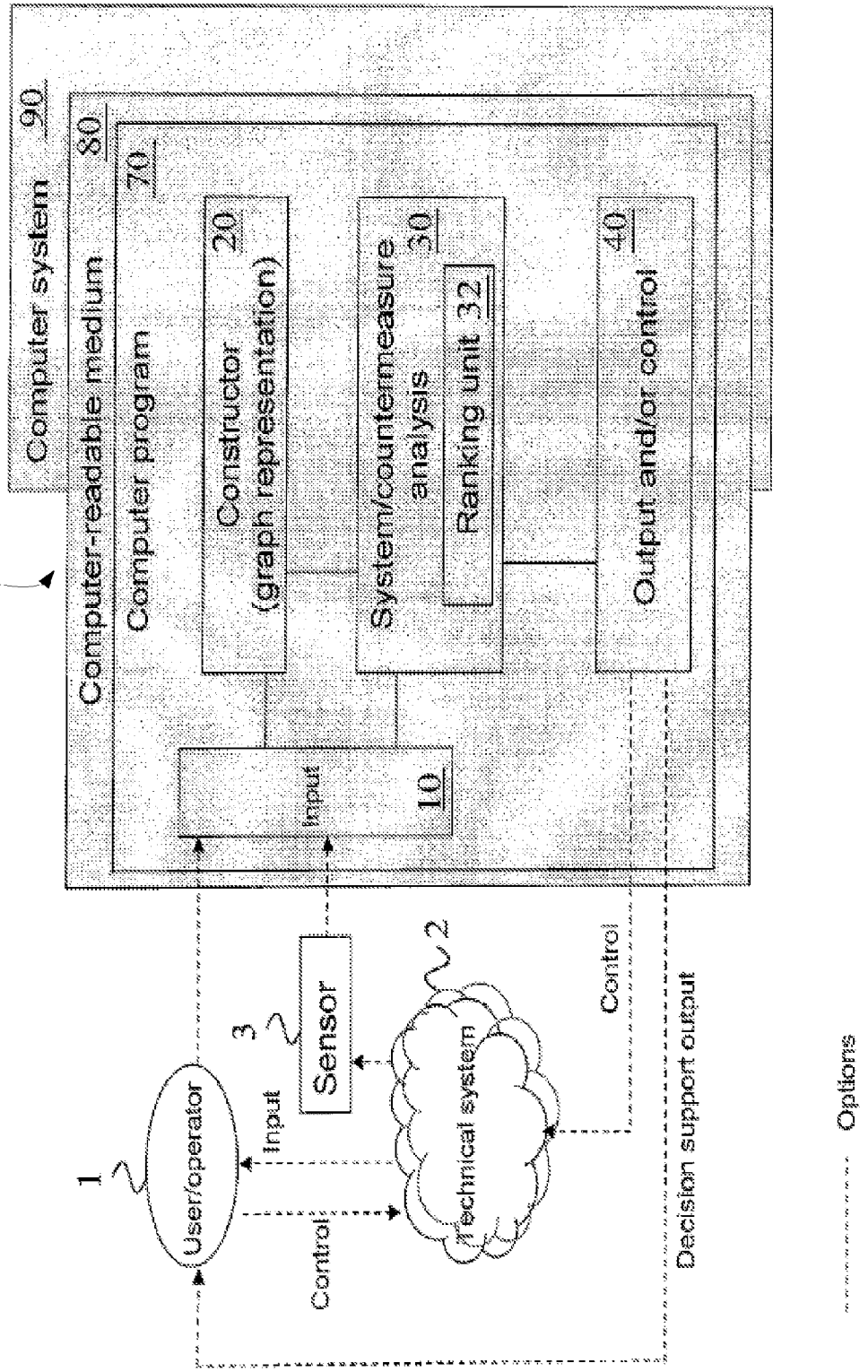
FIG. 13 is a schematic block diagram of an apparatus or decision support system in which basic functionality is implemented as a computer program product according to an exemplary embodiment of the invention.

FIG. 13 is a schematic block diagram of an apparatus or decision support system in which basic functionality is implemented as a computer program product according to an exemplary embodiment of the invention. In this embodiment, the input unit 10, the constructor 20, the system/countermeasure analysis unit 30 and the output and/or control unit 40 are implemented as a computer program 70, which is comprised in a computer-readable medium 80 to form a computer program product. When loaded into and executed by an associated computer system 90, the computer program 70 provides control information or decision support information based on a ranking of different sets of countermeasures, thus enabling a selected set of countermeasures to be taken to improve system security. For decision support, a ranking list or equivalent representation is provided. For system reconfiguration, suitable control signaling is provided from the computer program product to the technical system. This control signaling is then generated by the computer program on the basis of the ranking of the different sets of countermeasures. The computer program 70, when executed, will through its respective program means 10, 20, 30, 40 cause the computer system 90 to take technical information characterizing the technical system as input, and provide, based on the received technical information, a representation of potential attacks to the technical system in a directed graph of attack nodes having attributes related to the technical system, and also rank a number of different sets of countermeasures in a ranking list to enable a selected set of countermeasures to be taken to improve system security. The specific program means for ranking different sets of countermeasures is configured to logically apply, for each set of countermeasures, the set of countermeasures to attacks in said directed graph, and to determine, for each set of countermeasures, a rank of the applied set of countermeasures based on the effectiveness of the applied set of countermeasures with respect to reduction of the risk of attacks.

The computer program may also comprise an optional graph modifier, which will be explained later on.

As mentioned, the computer program 70 used for the security analysis is normally encoded or carried on a computer-readable medium 80 such as a CD, DVD or other computer memory structure for distribution (including also downloading of the program over the Internet) to an operator, which then may load the program into the computer system 90 for subsequent execution.

Figure 14:
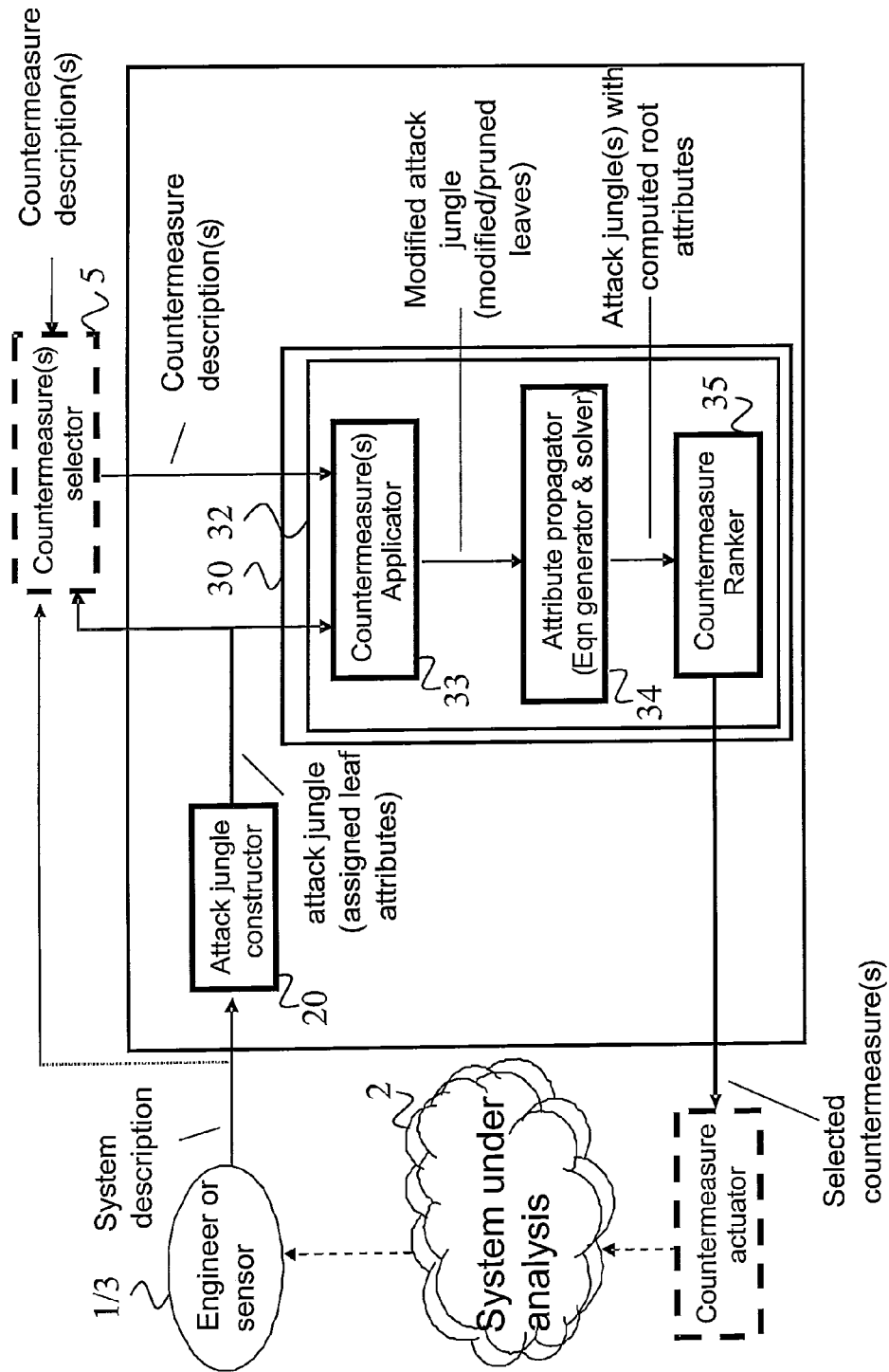
FIG. 14 is a schematic diagram illustrating an example of an apparatus for system analysis according to a preferred exemplary embodiment of the invention.

FIG. 14 shows a preferred exemplary embodiment of an apparatus implementing selected steps of the analysis process of FIG. 9. The reason that only selected steps are made part of the exemplary apparatus of FIG. 14 should be understood as reflecting that those steps are most suitable for automation.

The apparatus basically comprises a number of blocks carrying out the respective steps. Edges in the Figures indicate internal signaling paths and are labeled by the type of information communicated over said paths. We will now describe these building blocks in more detail and how they may be technically realized in a preferred exemplary embodiment.

Input Format

A system description is input to the security analysis and improvement apparatus (SAIA). This input is generated manually by an operator/engineer, or by sensors reporting the system's operational status, e.g. including the current configuration. The format of this input would typically depend on the technical nature and functionality of the system undergoing analysis. For simplicity, we shall here, by way of example, assume the system is a communications network providing communication between different communication nodes or units. In such case the system input could for instance be in machine-readable UML format (or other structured graphical representation) describing the communicating entities, their interconnections, attributed by security properties of said entities and said interconnections (e.g. whether an interconnection is encrypted or not, what keys are used, etc). Preferably, interconnections are also (quantitatively or qualitatively) classified according to the type/sensitivity of information carried. A perhaps even more suitable encoding of the system description would be using logic. Consider for instance and interconnection units A and B which is encrypted. It would then be possible to describe this interconnection's security properties using a "Prolog-like" logical statement such as:

Eavesdrop(AB):-GetPhysicalAccess(AB), BreakEncryption(AB), which states that it is possible to eavesdrop on the interconnection between A and B if it is possible to get physical access to the interconnection AND the encryption algorithm used can be broken. Considering that the first block of the apparatus is to build an attack jungle which could have and-vertices and or-vertices, it is clear that such a logical-expression representation is very suitable.

As mentioned, this input also includes initial attribute values associated with atomic attacks (i.e. those that will later form leaves of the attack jungle). These values can as mentioned be of different types including: integer, real, Boolean, intervals, or in general of a type depending on the attribute being analyzed (cost, difficulty, probability, . . . ). In case the input comes from sensors, these sensors could use a preconfigured database of "well-known" attacks where the attribute values could be considered "universally agreed". A commonly used database that could be used in an exemplary embodiment is CVE (Common Vulnerabilities and Exposures). For example, if "chance of software failure" is the attribute sought, the sensor could detect what software version the system is currently using, and then perform a look-up in a statistics database to find how likely it is that the software will "crash" in the next few minutes, under the given operating conditions. Other such exemplary attributes that are suitable for automatic input generation are: attributes associated with cryptographic algorithms and keys, and other forms of system configurations, etc.

Attack Jungle Constructor

This block 20 converts the system description into an attack jungle. The output format is thus a (directed) graph and any well known machine readable representation of graphs can be used such as adjacency matrices, neighbor lists/pointers, etc. The exact steps of the conversion would depend on the system description format. The logical formula representation mentioned above is clearly one of the most suitable, facilitating this conversion. This block may also assign attribute values to atomic attacks.

Countermeasure (Input) Selector

The purpose of this (optional) block 5 is to select one or more countermeasures and input them to the apparatus. The reason that this block is optional is that this function is most likely best suited for a manual operator to carry out. The data format of this input is in a preferred embodiment in the form of one or more sub-graphs of the attack jungle and/or changed attribute values for one or more of the leaves in the attack jungle. For instance, if a countermeasure is considered to (completely) remove an atomic attack, then the corresponding leaf would be input (with the intention to delete it from the attack jungle, see the description of the countermeasure applicator below). If on the other hand, the countermeasure only reduces some attribute associated with the attack, then the input would be in the form of a re-assignment of said attribute value.

Part of the countermeasure description could also be the cost of the countermeasure for later use of the countermeasure ranker, see below.

In this particular example, the overall analysis unit 30 includes a ranking unit 32, which in turn may include a countermeasure applicator 33, an attribute propagator 34 and a countermeasure ranker 35.

Countermeasure Applicator

This block 33 takes the representation of the countermeasures and applies them to the attack jungle input, e.g. deletes corresponding sub-graph(s) and/or modifies attribute value(s).

Attribute Propagator

This block 34 converts the attack jungle into an associated equation system(s) as will be discussed below and solves the corresponding equations (and/or inequalities), thereby assigning attribute values also to non-leaf nodes (including root(s)). This block thus carries out the "upwards" propagation of attributed values in the graph.

Countermeasure Ranker

This block 35 determines the effectiveness, in the form of risk reduction, of a countermeasure. In a preferred embodiment this is done by comparing how much attributes associated with vertices are affected (increased/decreased) by the countermeasure by comparing it to the original attack jungle (without any countermeasures applied at all) as a reference. Similarly, if more than one countermeasure is input, this block would compare their effectiveness, which as mentioned could also take the cost of the countermeasure into account. The output is one or more preferred (in some metric) countermeasures, and may be in the form of decision support information to a user/operator (engineer).

Countermeasure Actuator

This block 45 is optional as it may in many cases best be performed by a human operator. The function assigned to this block is to actually apply the outputted countermeasures to the system, e.g. to enable encryption on some system interconnection. It could also be replacing a cryptographic key, which is an example of a function that could be suitable for machine implementation of the countermeasure actuator 45.

As indicated above, and will be explained and exemplified in greater detail later on, attribute values are provided to a first subset of attributes, and for each applied set of countermeasures the set of countermeasures then affect at least part of the values of the first subset of attributes, and the countermeasure-affected values of this first subset of attributes is then propagated to a second subset of attributes. The ranker then extracts values of this second subset of attributes to compute a rank of the applied set of countermeasures.

Preferably, the first subset of attributes are related to leaf nodes in the directed graph of atomic attack nodes, and the second subset of attributes are related to one or more intermediate node and/or root node in the directed graph.

It is possible to define a set of countermeasures as a set of leaf nodes in the directed graph of attack nodes that the set of countermeasure counters, and the ranking unit 32 may then be configured to determine the rank of a set of countermeasures as a function of the attribute values of the intermediate and/or root node(s).

As previously indicated, the ranking unit 32 may be configured to determine the risk reduction of a set of countermeasures based on a comparison of how much values of the second set of attributes are affected by the applied set of countermeasures in relation to the corresponding so-called reference values of the second set of attributes without any applied countermeasures.

In a sense, the attribute propagator 34, which is also referred to as an equation generator and solver, converts the directed graph into an attribute-dependent set of equation systems. The equation systems may comprise constraints, e.g. some equations may be in the form of inequalities, e.g. "3x<2y", as explained later. This converting function is the reason for sometimes calling this part of the attribute propagator for a converter. The attribute values of the first subset of attributes may be provided to the attributes in the directed graph or equivalently in the attribute-dependent set of equation systems. The attribute propagator also solves the attribute-dependent set of equation systems to propagate the countermeasure-affected values of the first subset of attributes to the second subset of attributes. In case that the equation contains inequalities, "solving" means finding some satisfying assignment to the variables in the equation system. Preferably, the ranking unit 32 can then be configured for extracting values of the second subset of attributes from the solved equation systems to compute a rank of the applied set of countermeasures.

Figure 15:
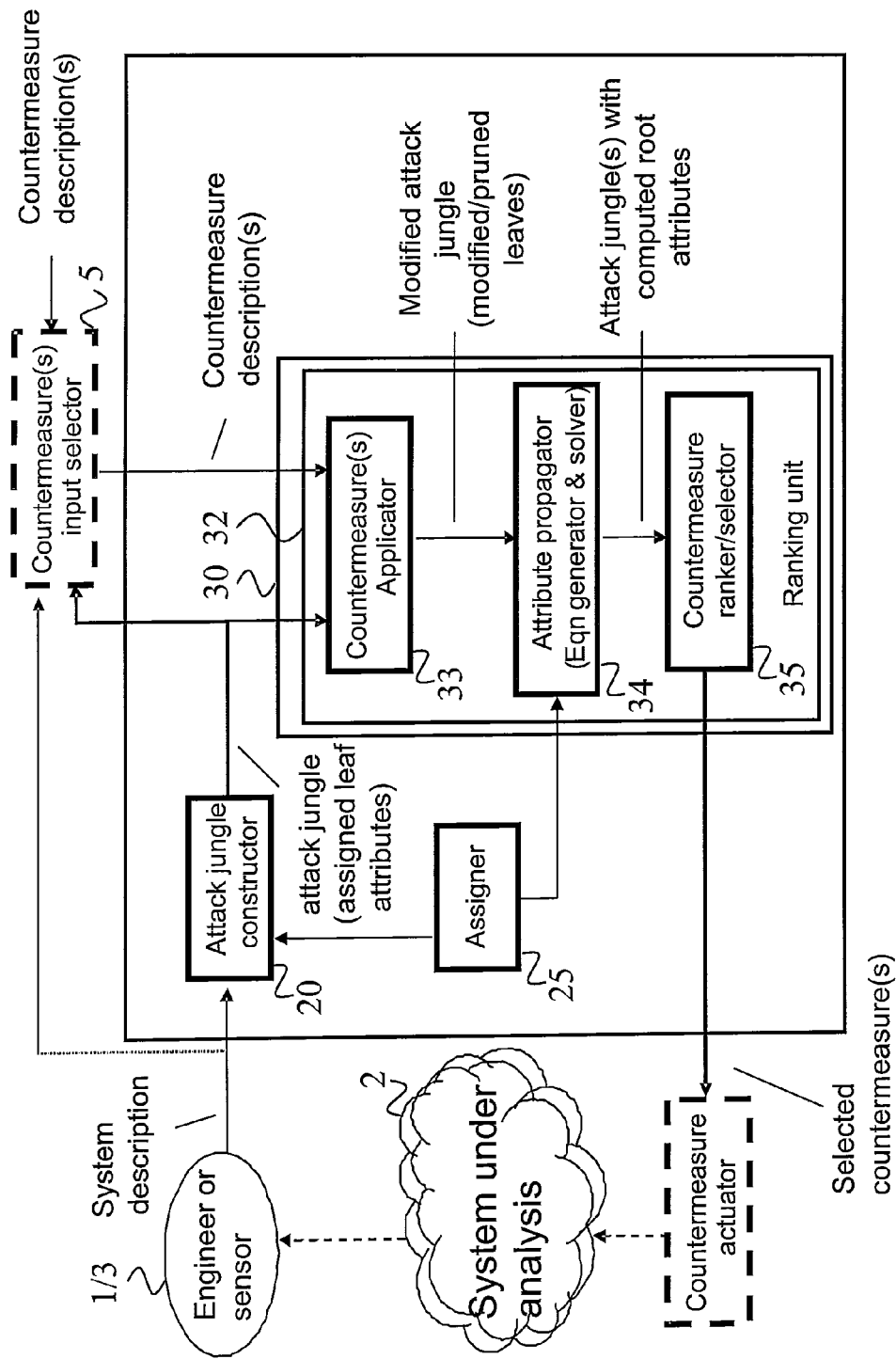
FIG. 15 is a schematic block diagram illustrating an alternative implementation of the apparatus shown in FIG. 14.

FIG. 15 is a schematic block diagram illustrating an alternative implementation of the apparatus shown in FIG. 14. In the example of FIG. 15 there is also an assigner 25 for assigning attribute values to the first subset of attributes, typically associated with a number of leaf nodes. This can also be done in combination with attribute values provided as input information to the attack jungle constructor 20. The assigner may operate directly with the constructor 20 to provide attribute values in the directed graph, and/or with the attribute propagator 34 to provide attribute values in the attribute-dependent set of equation systems.

Figure 16:
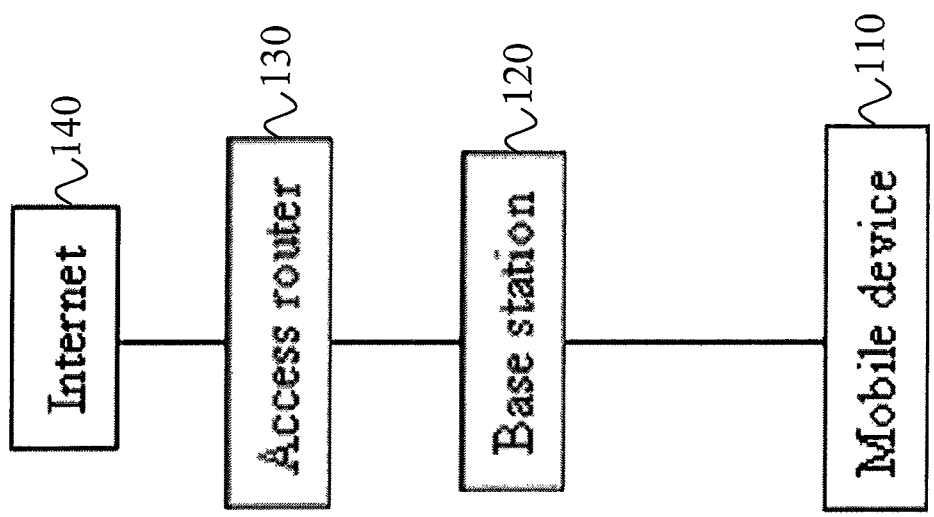
FIG. 16 schematically illustrates an example of a simple communications network.

In FIG. 16 a simple example of a communications network is depicted. It shows a mobile device 110 connected to an access network consisting of a base station 120 and an access router 130 which is connected to the Internet 140. Other examples of communication networks involving different communication units may of course be envisaged.

Figure 17:
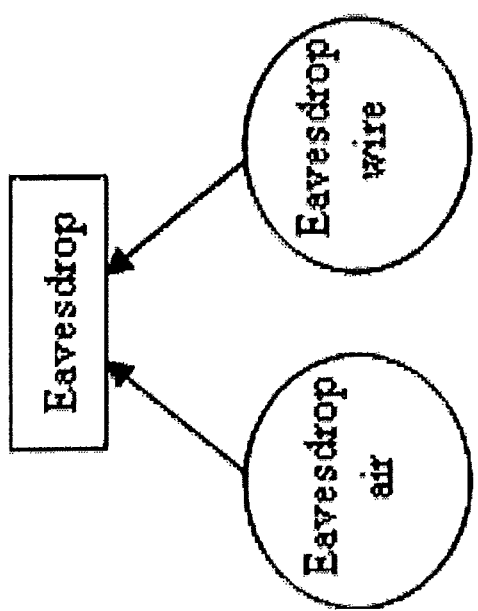
FIG. 17 schematically illustrates an example of an attack jungle depicting the two identified attacks for the communication system in FIG. 16.

An obvious goal for an attacker may be to eavesdrop on the traffic between the mobile device 110 and some communication unit on the Internet 140, as represented by the goal "eavesdrop" in FIG. 17. There are (at least) two ways this can be accomplished, eavesdropping on the wireless link between the mobile device 110 and the base station 120, or eavesdropping on the link between the base station 120 and the access router 130 (we assume that the attacker is not able to get access to the traffic once it leaves the access router). These two attacks are depicted in FIG. 17, as "eavesdrop air" and "eavesdrop wire" respectively.

Now, the attribute "likelihood" can be associated with each node of the attack jungle, expressing how likely it is that the corresponding attack is realized. For this example, we define likelihood to have a value between 1 and 5, where 5 is very likely to happen and 1 means that it is very unlikely that it happens. It may, e.g., be deemed that the likelihood for "eavesdrop air" is 4 and for "eavesdrop wire" is 3. Since either attack gets the attacker to the goal, the attribute value for the goal (the sink in the jungle) is the most likely of the two sub-attacks, namely 4.

Now, assume that two different countermeasures are being considered, encryption of the air link, and encryption of the wired link (between the base station and the access router). When the first countermeasure is applied, it assumed to make "eavesdrop air" impossible, and the second countermeasure makes "eavesdrop wire" impossible. That means that if the first countermeasure is applied, the attribute vale of the sink would be 3, since it is still possible to eavesdrop on the wired link. If the second countermeasure is applied, the attribute value of the sink would still be 4, since the attacker could still eavesdrop on the air/radio link. The ranks are hence 3 for the first countermeasure, and 4 for the second countermeasure, and 0 for the combination of the two countermeasures since there is no way to reach the sink in this case. The most secure choice for the countermeasure actuator would in this case be to select both countermeasures, i.e. to configure the system to encrypt both links. However, assuming that it for some reason is very expensive to encrypt the wired link, it may be more cost-effective to only choose to implement the first countermeasure.

At a finer level of detail, the analysis could also consider which encryption algorithm to use. For instance, algorithm A could be more secure than algorithm B, but A could be associated by a higher "cost", e.g. in terms of bandwidth or processing power, etc.

For a better understanding of the invention, exemplary embodiments will be described in more detail in the following.

Example of Formalization and Definitions:

In a preferred, exemplary embodiment a generalization of attack trees is employed for internal data representation. This representation is called an "attack jungle".

Attack Jungle:

An attack jungle is a triplet (V,E,A) such that (V,E) is a directed finite graph without self loops and A is a unary relation on V such that A(v) is equivalent to the fact that v is an and-node.

This definition allows for any type of graph, and this will be motivated later in this section. The reason for not calling this an attack tree is simply that it does not need to be a tree in graph-theoretic sense, and therefore using the original term would be too much abuse of well established nomenclature. The definition thus allows for cycles and also for multiple sinks (i.e. roots) if required for an appropriate representation of the security attacks on the technical system. In other words, an attack jungle is a more general/advanced or flexible form of graph representation of attack nodes representing security attacks or threats.

As clear to the skilled person, a directed graph means that there is a directional indication between nodes, such as x and y, prescribing whether the connection goes from x to y, or from y to x.

Direct Predecessors:

Let (V,E,A) be an attack jungle. Then the set of direct predecessors to a node v in V is the set {v' in V: (v', v) in E} and is denoted DP(v). For simplicity, we will assume from now on an ordering on V such that i<j and $|DP(v_j)|=0$ implies that $|DP(v_i)|=0$, $|DP(v_{n-1})|=0$ and $|DP(v_n)|$ not equal to 0 for some non negative integer n, i.e., that the sources of the graph are the first n nodes in the ordering.

Attribute Domain:

An attribute domain is a structure <D,Δ, ▼> where Δ: D×D→D and ▼: D×D→D are two associative and commutative functions called the conjunctive and disjunctive combiner respectively. That is, the two functions Δ and ▼ take pairs of inputs from D and produces an output also in D.

For information on the concept of an attribute domain, reference is made to [8].

The two combiner functions have a very clear intuitive meaning: they are the rule defining how to combine attributes of the predecessors of a node to get the attribute value in that node. The conjunctive combinator is, as the name suggests, used for and-nodes, whereas the disjunctive is used for or-nodes. Previously, two examples where given of these combiners: the and/or rules for the possibility/impossibility and the min/sum rules for the cost of an attack.

Strongly Connected Component:

Let (V,E) be a directed graph. Then a Strongly Connected Component (SCC) is a maximal subset S of V such that for any two nodes $v_i$, $v_j$ in S there is a path between $v_i$ and $v_j$. The set of SCCs in a graph (V,E) is denoted by SCC((V,E)).

Reusable Attacks and Overestimation of the Minimum Cost

In the case of the cost, the naive definition of the attribute domain would, as previously discussed, be <N,+, min>. A problem here is that the conjunctive combiner does not respect the law of compositionality. That is, with the definition of Δ=+, a modeling mistake has been made. As the attack tree construction is made according to a decompositional paradigm, this is indeed a problem. An even bigger problem is that the solution to this problem is not at all straight forward.

Figure 18:
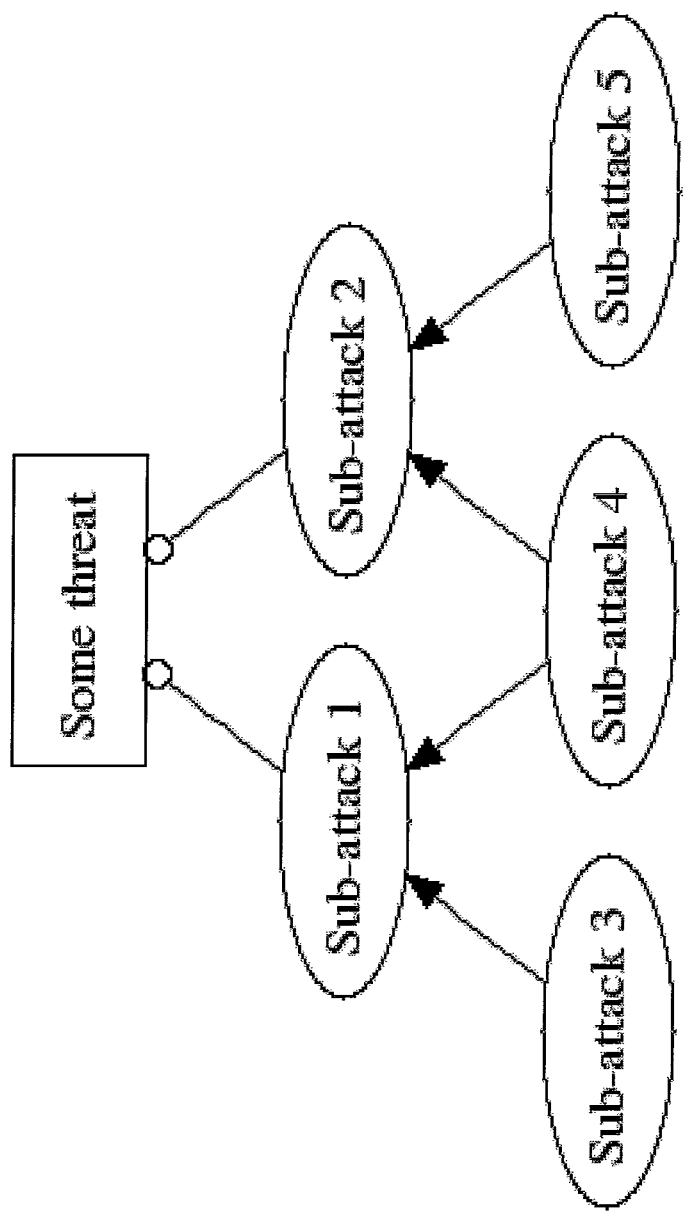
FIG. 18 schematically illustrates an example of a combined Directed Acyclic Graph (DAG).

The reason that there is no compositionality is that the result of a sub-attack can be reusable. As an example, see FIG. 18. The reason for the overestimation in this case is clearly that the result of the sub-attack of getting hold of a crowbar is reusable: once the crowbar is in the attacker's possession it can be reused an arbitrary number of times. In the model, there is no distinction made between reusable nodes and non-reusable. To solve the overestimation problem, this extra information has to be incorporated into the model as well in some way.

In a different, but related aspect, the minimum cost differs from the other questions as well. It is that the cost of a sub-attack is dependent on the final goal. As an example of this, another previous example can be used, namely FIG. 18.

Suppose that sub-attack 3 and 5 cost $5 each and that sub-attack 4 is reusable and costs $8. Then the greedy propagation algorithm would give the result as the DAG of FIG. 19A, whereas the immediately obvious optimum (for the attacker) would be the costs as in the DAG of FIG. 19B.

Figure 19B:
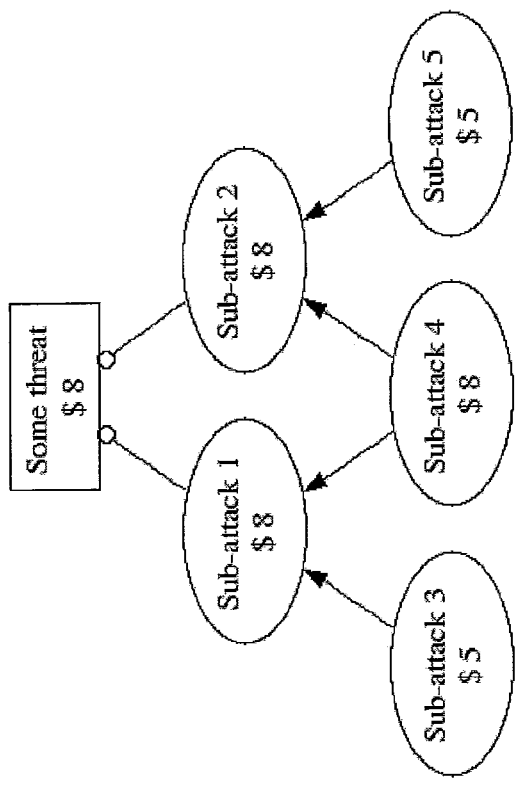
FIGS. 19A-B schematically illustrate two different cost results for the DAG of FIG. 18.
Figure 19A:
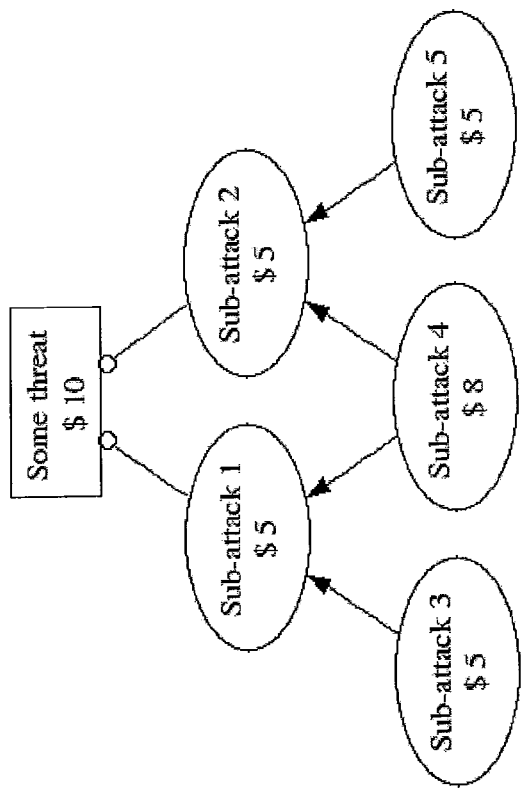

These two DAGs of FIGS. 19A and 19B show that the cost must be computed with a specific goal in mind, as opposed to the other aforementioned attributes. The discovery of this special property of the minimum cost attribute caused the problem to be intractable in the setting of this invention, and therefore from here on only the attributes whose combiner functions are easily defined are discussed.

The present invention is able to model reusable attacks as will be discussed later.

Multiple Sinks

From the above discussion it is clear that if an attribute of a sub-attack is easily definable as a function of its direct predecessors (i.e. it is compositional), then it does not depend on the final threat being examined. Therefore there is no problem in having multiple sinks in the DAG.

Cycles

With the definition of an Attack Jungle as above, cycles are allowed in the jungle. The reason for this is that there are situations where cycles are a reasonable way of modeling the threat. Cycles are briefly mentioned in some prior arts work on attack graphs. In [3,9,13] the possibility of cycles occurring is mentioned but not elaborated. In particular, no prior arts method for automatic processing of attack graphs appear to be known that can handle cycles. For instance, cycles are explicitly ruled out in the attribute propagation mechanisms discussed in [8].

Figure 20:
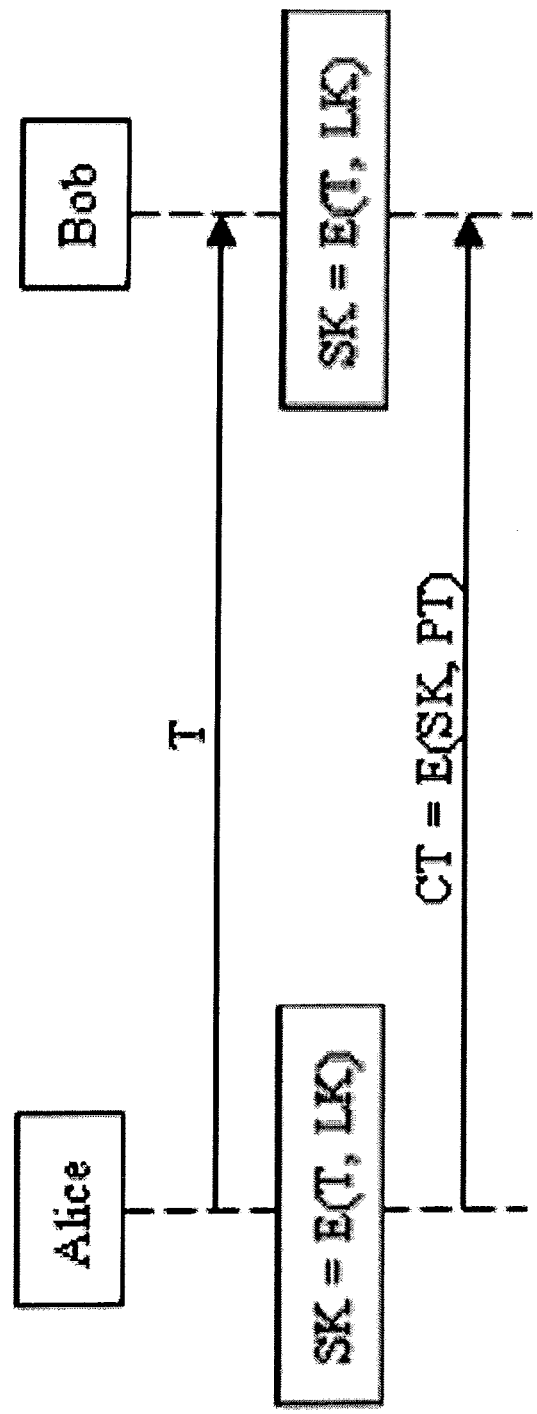
FIG. 20 schematically illustrates an example protocol for key management and traffic protection.

As an example, to understand how cycles could arise, consider the following hypothetical example of a protocol for key management and data traffic protection (shown in FIG. 20).

Alice and Bob are assumed to share a long-term secret key LK, and to derive a session key, Alice sends a timestamp (the wall-clock time, say) to Bob. Both Alice and Bob next derive the session key SK to use in this particular session by encrypting the long-term key LK using the timestamp as the key. This completes the key management protocol. Following this, plaintext traffic (PT) can be sent encrypted as ciphertext (CT) between the two parties using the session key SK as encryption key.

Figure 21C:
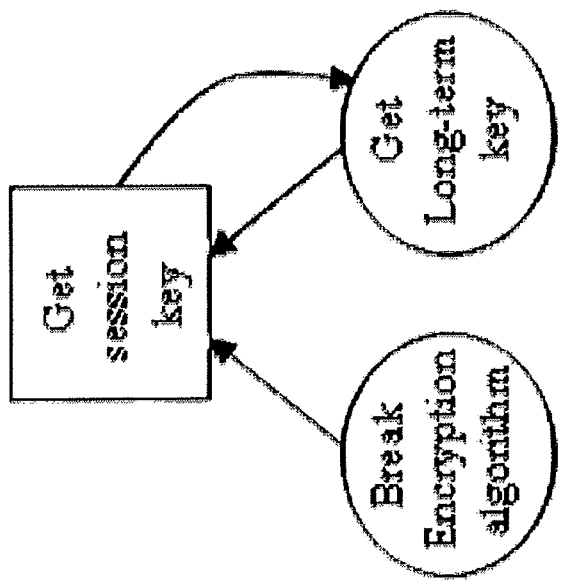
FIGS. 21A-C schematically illustrate an example of construction of an attack jungle containing a cycle.
Figure 21B:
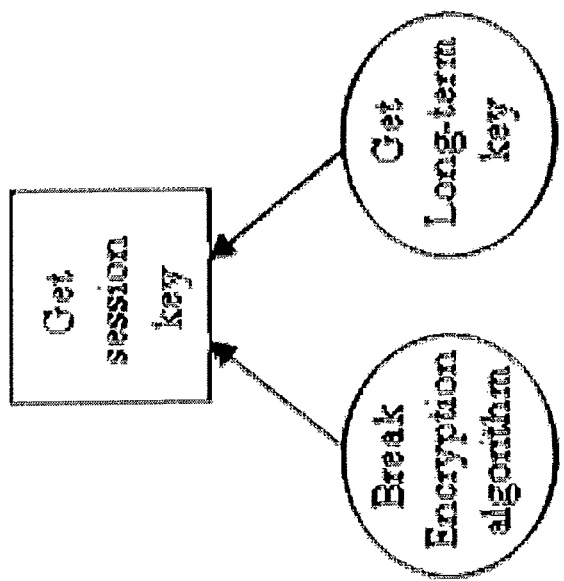
Figure 21A:

A fundamental problem with the described protocol, is that, if an attacker is able to get hold of the session key SK, e.g., by breaking the encryption algorithm E(,) used to protect the traffic, and manages to listen to the timestamp sent, it is trivial to decrypt the long-term key. An attack jungle can be constructed to model the threats against this protocol as follows. It may be useful to start by noting that the attack goal is to obtain the session key SK (see FIG. 21A). The illustration of FIG. 21B shows that both obtaining the long-term key (somehow) and breaking the encryption algorithm leads to that the session key is compromised (the attack goal is reached). The illustration of FIG. 21C shows the fact that given the session key, it is possible to obtain the long-term key (as described above).

There is now a cycle in the graph, that has arisen from legitimate modeling. In this case, where all nodes in a cycle are or-nodes, the interpretation of this cycle should be that each sub-attack contained within it represents different forms of the same information.

The cycle could also be interpreted as a way of saying that one way to get the session key, is by first getting the session key, transforming it to the long-term key and then transforming it back to the session key. Obviously, this is not what is intended. Instead, this should be thought of as a type of syntactic sugar in this case, meaning that there are another way of expressing it, using more nodes and no cycle, but this the more aesthetically pleasing way. Specifically in this case, what is being modeled is that that (assuming T can be obtained) knowledge of either of the keys implies knowledge of the other key.

Summing up, the nodes in a cycle, or more general, in an SCC, should be thought of as different ways of representing the same information. Equivalently, they can be thought of as an equivalence class of nodes. With this in mind, it seems reasonable to make a transformation where the graph is turned into one with only one node for each equivalence class by using the following algorithm:

```
Reduce-Equivalence-Classes-In-Jungle((V,E,A))
1  for each S in SCC((V,E))
2    do if all v in S : not A(v)
3      then V = V union {v'}
4        for each (vi, vj) in E
5          do if vj in S
6            then if vi in S
7              then E = E \ {(vi, vj)}
8              else E = (E \ {(vi, vj)}) union {(vi, v')}
9        V = V \ S
10 return (V,E,A)
```

Figure 22A:
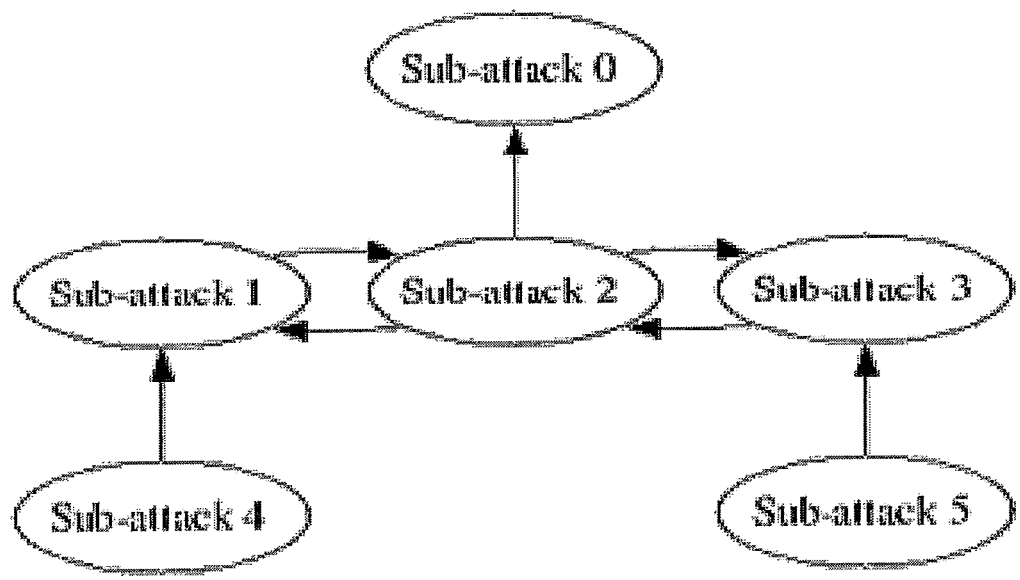
FIGS. 22A-B schematically illustrate how several attack nodes are merged into a single representative node.
Figure 22B:
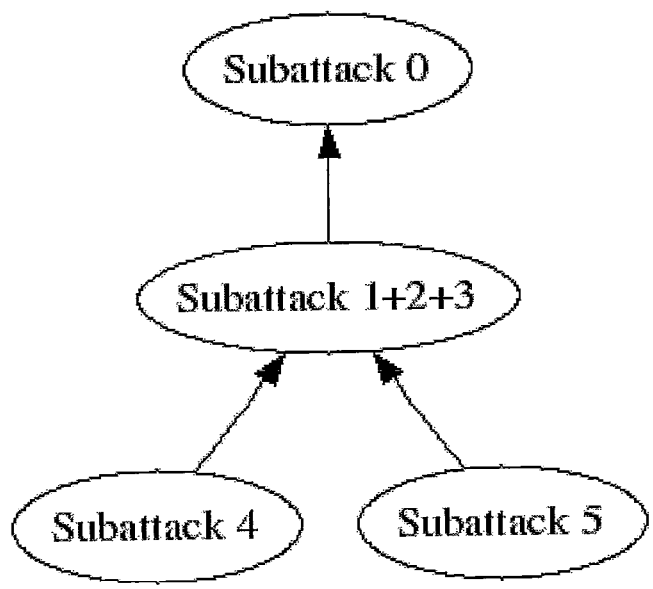

In FIGS. 22A-B the result of the algorithm can be viewed, where FIG. 22A shows the input graph and FIG. 22B shows the resulting graph. Several attack nodes denoted "Sub-attack 1", "Sub-attack 2" and "Sub-attack 3" in FIG. 22A are merged into a single representative node denoted "Subattack 1+2+3" in FIG. 22B.

With reference once again to FIG. 13, an example of a so-called graph modifier 22 is shown for modifying the directed graph by replacing a set of cyclically interconnected attack nodes by a single representative node. The graph modifier of FIG. 13 is implemented as part of a computer program product for execution by a computer hardware system, but may be implemented in any manner, and may also form part of any of the embodiments illustrated in FIGS. 10-12 and 14-15.

As was emphasized in the previous example with the two keys, the SCC in the graph contained only or-nodes. There are, however, two more cases to consider, namely SCCs with only and-nodes and SCCs with at least one node of each type.

If there is an SCC which contains only and-nodes, the modeling is flawed and does not make sense. This is clear when thinking of how to achieve the sub-attack represented by an and-node. To accomplish the attack all its direct predecessors must be accomplished. Since at least one of the predecessors is present in the SCC, at least one other node in the SCC has to be accomplished before the and-node.

As all nodes in the SCC are and-nodes, none of them can be accomplished first. As there are no accomplished nodes a priori, none of them will ever be accomplished.

The third case, with at least one node of each type, does make sense and could occur in practice. This is best illustrated by an example, as the one in FIG. 23. This scenario seems perfectly valid, and evaluating it under different circumstances will give different results, all of them reasonable.

An Exemplary Alternative to the Previously Described Exemplary Propagation Algorithm With SCCs in the graph, the original derivation of attribute values by propagation according to the previously described propagation algorithm does not work. This is because there will be situations where no more attribute value can be derived, and there will still be nodes that have not yet been assigned a value because of cyclic dependencies. Instead the following exemplary approach seems reasonable and will be used in an exemplary embodiment of the present invention:

Suppose that there is an attack jungle $J=(V,E,A)$ that is reduced using the above presented or similar algorithm to contain no SCCs with only or-nodes, and an attribute domain $D=<D,\Delta,\blacktriangledown>$. Let $f_A(v)=1$ if $A(v)$, and $f_A(v)=0$ otherwise. Given an initial assignment of attribute values w in $D^n$, the attribute values of the nodes not corresponding to the atomic attacks could be computed according to an exemplary alternative propagation algorithm by finding an assignment to the vector $(d_0, d_1, \ldots, d_{|V-1|})$ (e.g. solving an equation) such that the following holds:

1. $(d_0, \ldots, d_{n-1})=w$
2. $n<=i<=|V|$ implies that $d_i=f_A(v_i)*\Delta(\{V_j: v_j \text{ in } DP(v_i)\})+(1-f_A(v_i))*\Delta(\{d_j: x_j \text{ in } DP(v_i)\})$
3. For all S in SCC((V,E)): There exists $v_i$ in S: not $A(v_i)$ and $d_i=\blacktriangledown(\{d_j: v_j \text{ in } DP(v_i)\backslash S\})$ Here the notation is abused slightly by applying the combiner to some set of arbitrary size instead of a 2-tuple. This extension is however trivial to make, as the combiners are required to be associative and commutative.

Figure 23:
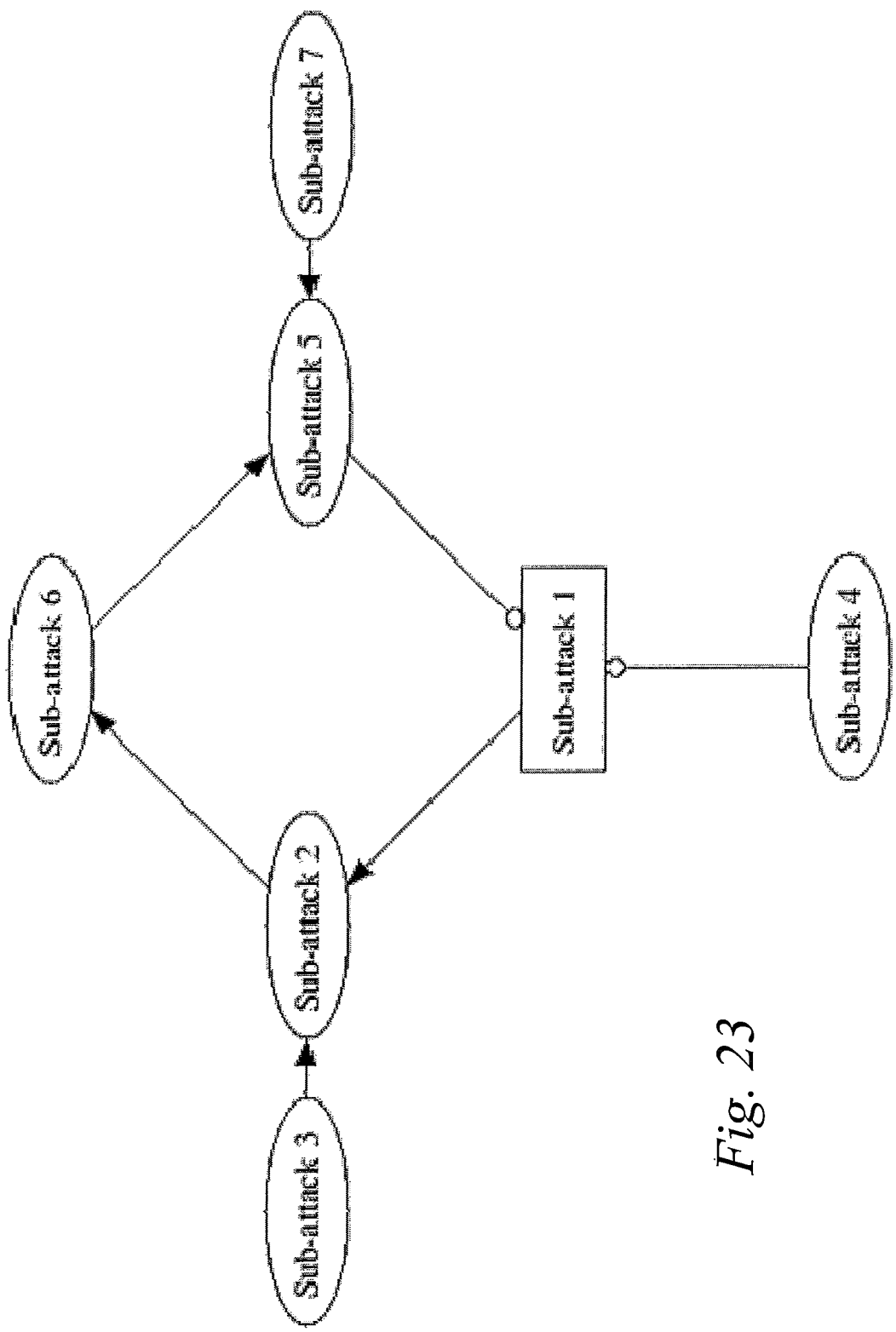
FIG. 23 schematically illustrates an example of a Strongly Connected Component (SCC) with both types of nodes.

FIG. 23 illustrates an example of an SCC with both types of nodes.

This means that a vector is sought such that the answer to the question corresponding to D for the attack represented by node $v_i$ is to be found at entry $d_i$.

The tree conditions might need some explanation:
1. expresses the obvious condition that the vector must have as initial n entries the exact same values as the initial assignment to the atomic attacks.
2. says that the value of a non-atomic attack is a function of its direct predecessors, and that the function used is determined by whether it is an and-node or not.
3. says that in every SCC, there must be some node that got accomplished first, using only those direct predecessors that are not in the SCC, and that the node for which this holds must be an or-node. The reason for the or-node requirement is, as was mentioned earlier that for an and-node v to be accomplished, all nodes in DP(v) has to accomplished first, and since v is in an SCC, at least one element in DP(v) must be in the SCC as well.

It is worth noting that with J as an ordinary tree, the third condition disappears. What is left is a system of equations, solvable by top-down substitution.

Application to the Original Problem

It has already been noted that the question-specific part of the problem is the attribute domain. The function of the attribute domain is to define in what way the attribute value of a node is determined by its direct predecessors. The three main questions that can be answered in the way described above are the following:

1. "Is any attack possible?" Since what is sought is a truth value, $D=\{0, 1\}$ can be used. The conjunctive combinator ($\Delta$) describing if an and-node can be accomplished is reasonable to take as $\Delta=\min$, as an and node can be accomplished if and only if all of its direct predecessors can be accomplished. Taking $\blacktriangledown=\max$ is also reasonable as an or-node can be accomplished if and only if at least one of its direct predecessors can be accomplished. The problem instance vector, w is of course defined in such a way that $w_i=1$ if and only if atomic attack $v_i$ is possible to accomplish.

2. "Is [some common property] needed for all successful attacks?" As an attack consists of its atomic attacks, and the non-leaf nodes of the tree shall be viewed as a recipe for how to combine them, the property is needed for an attack if and only if it is needed by all its atomic attacks. Thus one can use the attribute domain $<\{0, 1\}, \max, \min>$, and each component $w_i=1$ in the problem instance vector if and only if the atomic attack vi fulfills the property sought to investigate.

3. "What is the minimum required skill level for a successful attack?" This is really a generalization of the former question, and can therefore be handled by having $<N, \max, \min>$ as the attribute domain and the component $w_i$ in the problem instance vector defined as the required skill level to perform atomic attack $v_i$.

The above formalization says nothing about how to find the solution, but simply states the problem in terms of a system of equations. This system of equations has to be solved somehow, and there are numerous ways of doing this (e.g. using a standard constraint solver).

Handling of Reusable Attacks

As already noted, the concept of reusability of an attack complicates the analysis. A node being reusable means that once executed, the result of the reusable node can (potentially) be used an unlimited number of times. Reusability is a property assigned individually to all nodes in the attack tree, and not only to the atomic attacks. The notion of reusability is simple on an intuitive level, but in combination with multiple sink-setting, it is not immediately clear what it means that a node is non-reusable.

If the non-reusable attack is "accumulate k euros", it would be reasonable to allow the accomplishment of one of its direct successors, as that action would involve spending the money. If, however, the action were "break [some important] cryptographic key", then the key might not be reusable to accomplish the same direct successor, but may very well be used in accomplishing multiple direct successors once. The former concept will in the present invention be referred to as type 1 non-reusability, and the latter type 2 non-reusability. The intuition about these concepts should be that in type 1 nodes there is a dependency among the successors, and in type 2 nodes there isn't.

As the models as described so far do not include information regarding the reusability of a node, an extension of the definition is needed.

To simplify the graphs, another thing needs to be considered as well inherent in the questions where reusability matters is that the number of times an attack is accomplished also matters. Therefore, a shorthand is adopted for representing that for attack a to be accomplished by its predecessor b, b has to be accomplished k times. This is done by associating the number k with the edge (a,b).

An Extended Attack Jungle is a 5-tuple (V,E,A,r,M) such that (V,E,A) is an ordinary attack jungle, r: V→{R,1,2} is a function describing for each node whether it is reusable and if so what type of non-reusability it exhibits, and M: E→{0, 1, 2, ... } is a function assigning to each edge the number of times the source has to be accomplished for the target to be accomplished.

This extended attack jungle is visualised as before, with some extra information incorporated by labeling each vertex v with an "R", a 1 or a 2 to visualise r(v), and by labeling each edge e with M(e) if and only if M(e) is non-zero.

Figure 24:
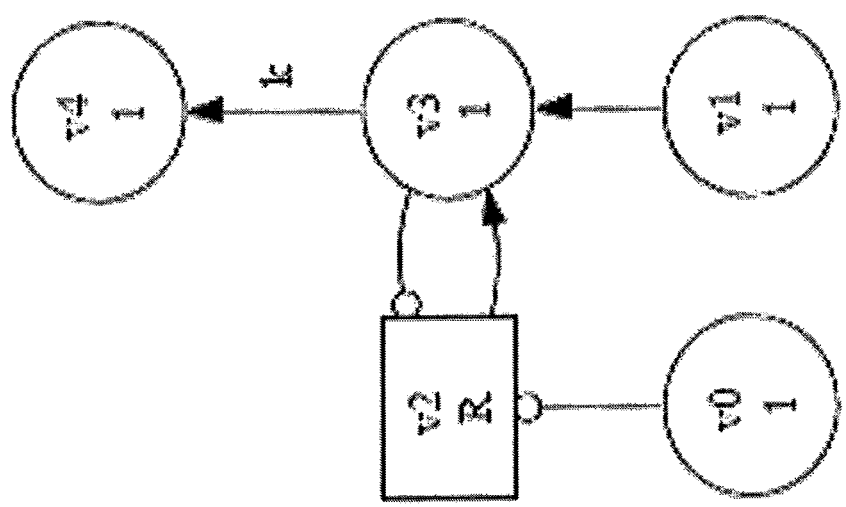
FIGS. 24-26 schematically illustrate examples of extended attack jungles capable of handling reusable attacks.

An example of an extended attack jungle can be seen in FIG. 24.

Figure 25:
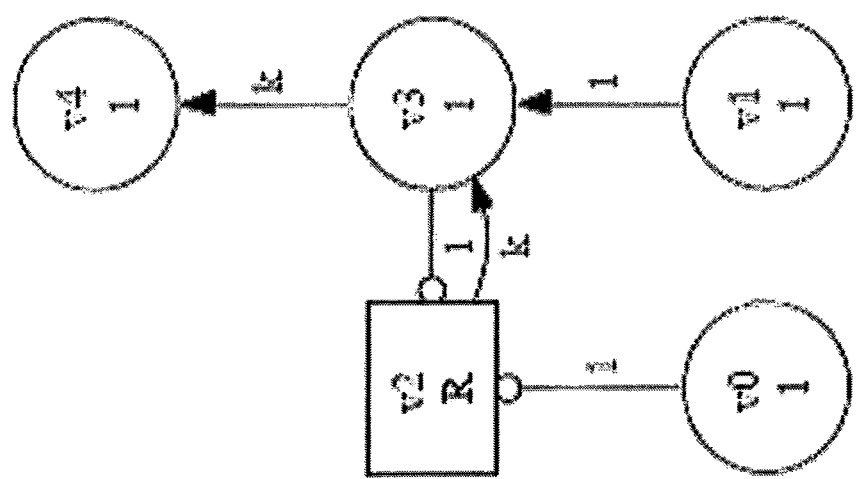

From the example it is also clear that cycles makes sense. Suppose that the cost of realizing atomic attack v0 is $c_0$, whereas the cost of realising atomic attack v1 is $c_1$ and consider the inequality $c_0+c_1 <= c_1*k$. If the inequality holds, the cheapest way to accomplish the goal is to accomplish each atomic attack once, accomplishing v3 from v1, and from v3 and v0 accomplish $v_2$. Then, using the result of v2 k times, v3 can be accomplished k times, finally enabling the accomplishment of v4 from v3. This can be seen in FIG. 25, where the labels on the edges are not a description of M(e), but to be interpreted as the number of times the result of the source has been used.

Figure 26:
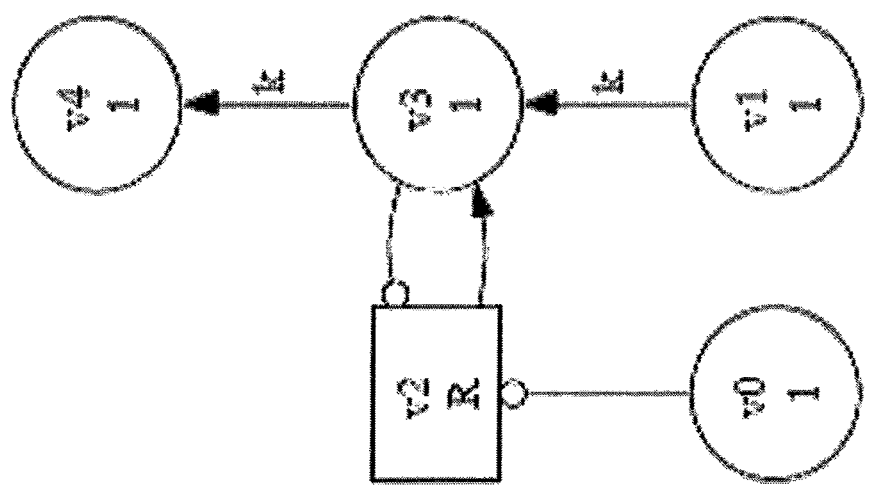

On the other hand, if the inequality does not hold, the cheapest way of accomplishing v4 is by simply realising v1 k times, and then accomplish v4 via v3. This is illustrated in FIG. 26.

To solve the problem of finding the minimum cost of realising an attack, two things are needed in addition to the extended attack jungle (V,E,A,r,M). As before, there is a need for rating the atomic attack according to the attribute in question. In this case, this is supplied as a cost vector c, such that the cost of realizing atomic attack vi is $c_i$. But we now also need to define the final goal g of the attack. This is because as was just discussed, the optimum cost of accomplishing a subattack is dependent on not only the corresponding node, but also on the final goal.

What now is sought is a vector $m=(m_0, m_1, \ldots, m_{n-1})$ such that if each atomic attack vi is accomplished exactly $m_i$ times, then it enables the accomplishment of (goal) node g. Furthermore, there is also the condition that there is no other vector m' which enables the accomplishment of g as above, but such that m'*c<m*c, where * here denotes is the ordinary scalar product.

There are numerous possible ways to handle the above problem. Below, some exemplary methods are presented. Due to notational/typesetting problematics, we shall sometimes use an underscore, "_" to denote foot-index on quantities, i.e. "x_i" denotes the same thing as "$x_i$".

In the solution to the original problem, a set of equations were derived where each variable correspond to a node in the attack jungle. As the path matters in the minimum cost problem, a similar but different approach that might prove to be successful is to derive a set of equations where the variables corresponds not to the nodes but to the edges.

To derive such a set of equations, each of the six possible node-types needs to be considered. The octagonal shape in FIGS. 27-32 are used to emphasise that those nodes can be either or-nodes or and-nodes of any type in {1,2,R}. Furthermore, the symbol $a_{(m,n)}$ is used for each edge to denote $M((v_m, v_n))$, and the notation $f_{(v\_m,v\_n)}$ is used to denote the number of times that $v_m$ is actually used to accomplish $v_n$. The value $f_{(v\_m,v\_n)}$ is referred to as the "flow" between $v_m$ and v_n, although it is important to note that this is not flow in the standard sense. In all cases below, $DP(v_j)=\{v_i, v_{i+1}, \ldots, v_{j-1}\}$ (direct predecessor) and $v_i$ belongs to the set $DP(v_m)$ if and only if m belongs to the set $\{j+1, j+2, \ldots, k\}$.

Figure 27:
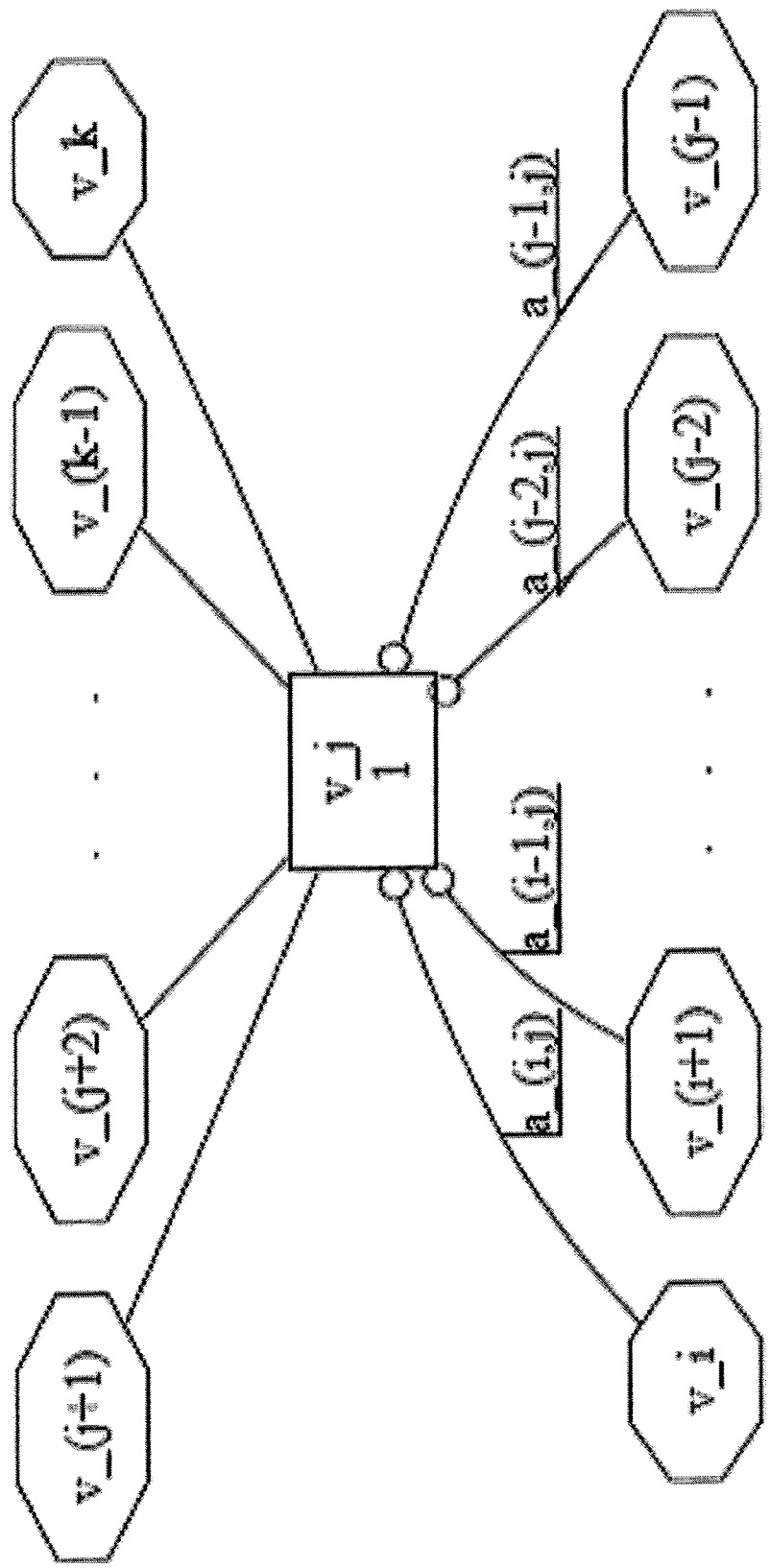
FIG. 27 schematically illustrates an example with a non-reusable and-node of type 1.

Non-reusable and-nodes, type 1: The case of a non-reusable and-node of type 1 is depicted in FIG. 27.

As $v_j$ is of type 1, the sum of the output flow is equal to the number of multiples of the minimum number required along the arcs leading into $v_j$. Formally, this condition can be written $$\bigwedge_{n=i}^{j-1}\left(\sum_{m=j+1}^{k} f_{(v_j,v_m)} = \frac{1}{a_{(v_n,v_j)}} f_{(v_n,v_j)}\right)$$

Figure 28:
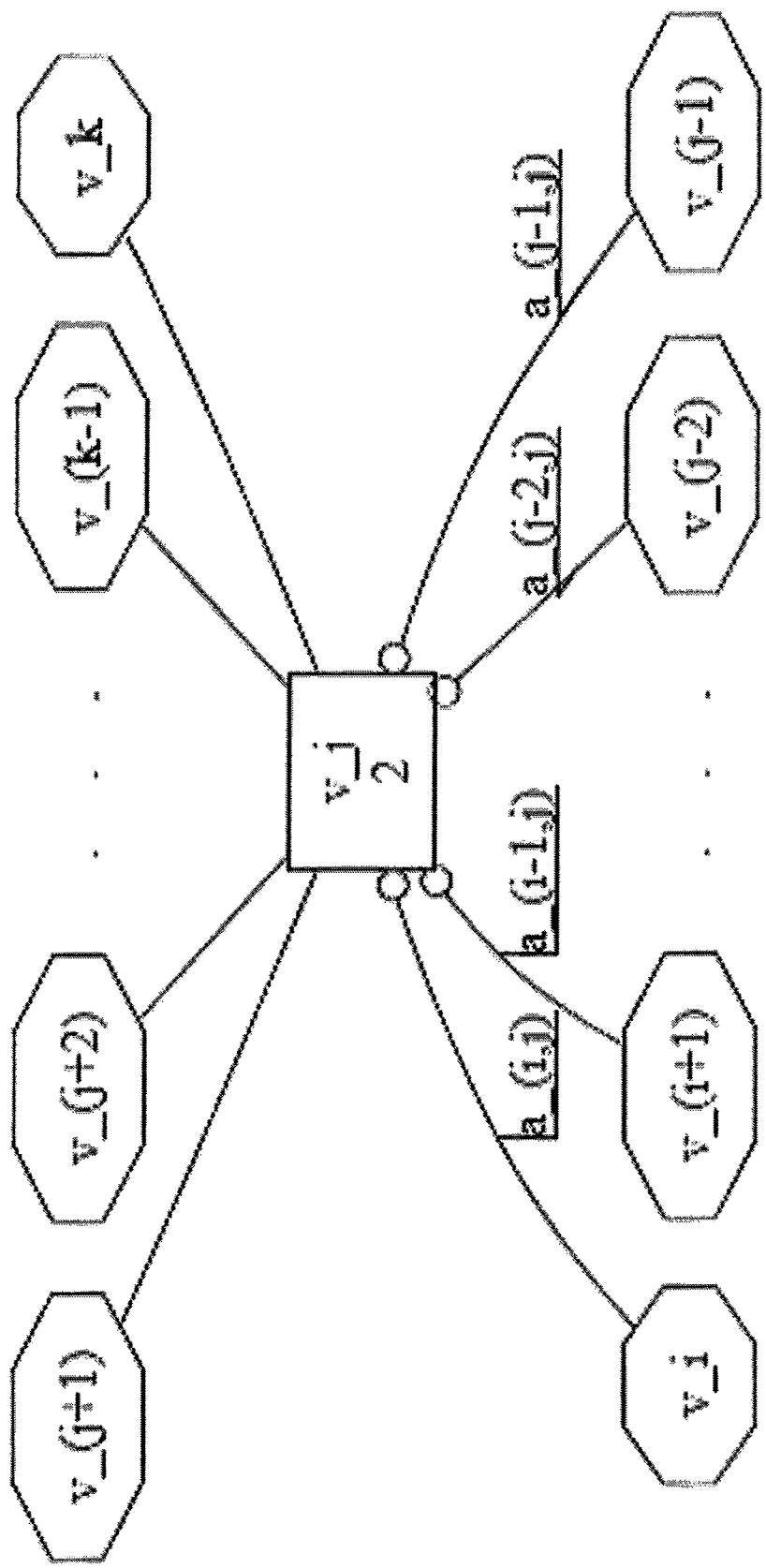
FIG. 28 schematically illustrates an example with a non-reusable and-node of type 2.

Non-reusable and-nodes, type 2: This case is depicted in FIG. 28.

As $v_j$ is of type 2, each of the output arcs needs to have a flow less than or equal to the number of multiples of the minimum number required along the arcs leading into $v_j$. Formally, this condition can be written $$\bigwedge_{n=i}^{j-1}\left(\bigwedge_{m=j+1}^{k} f_{(v_j,v_m)} \leq \frac{1}{a_{(v_n,v_j)}} f_{(v_n,v_j)}\right)$$

Figure 29:
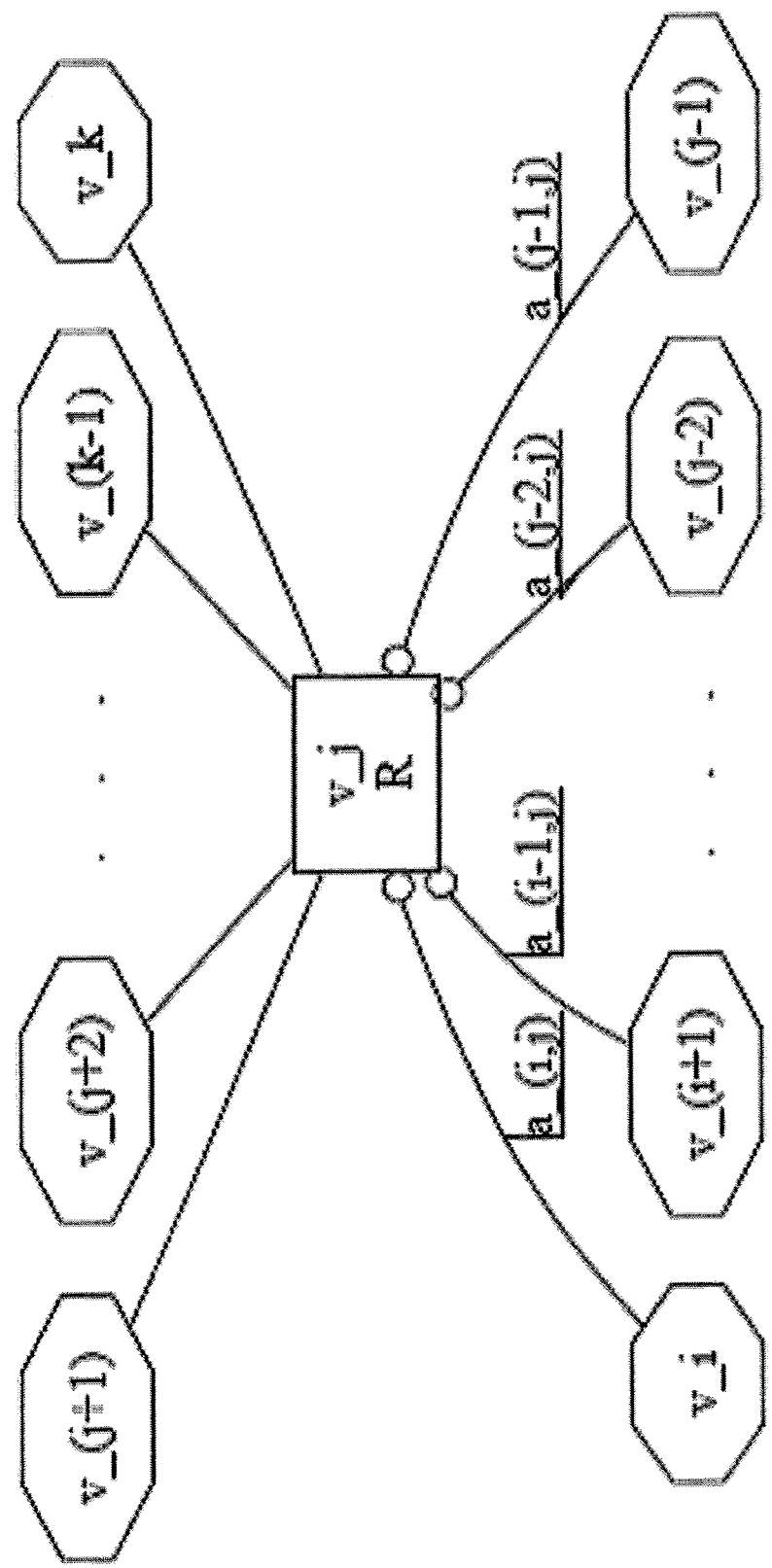
FIG. 29 schematically illustrates an example with a reusable and-node.

Reusable and-nodes: The case of a reusable and-node is depicted in FIG. 29.

Note that when finding the minimum cost it is never desirable to accomplish a reusable node more than once. This implies that the flow along an ingoing edge will be either 0 or the required minimum number. Also note that it is only desirable to accomplish the node if the result is to be used. Formally, this can be stated as the following two conditions $$\left(\bigvee_{m=j+1}^{k} (f_{(v_j,v_m)} > 0)\right) \Longleftrightarrow \left(\bigwedge_{n=i}^{j-1} (f_{(v_n,v_j)} = a_{(v_n,v_j)})\right)$$

$$\left(\bigwedge_{m=j+1}^{k} (f_{(v_j,v_m)} = 0)\right) \Longleftrightarrow \left(\bigwedge_{n=i}^{j-1} (f_{(v_n,v_j)} = 0)\right)$$

Figure 30:
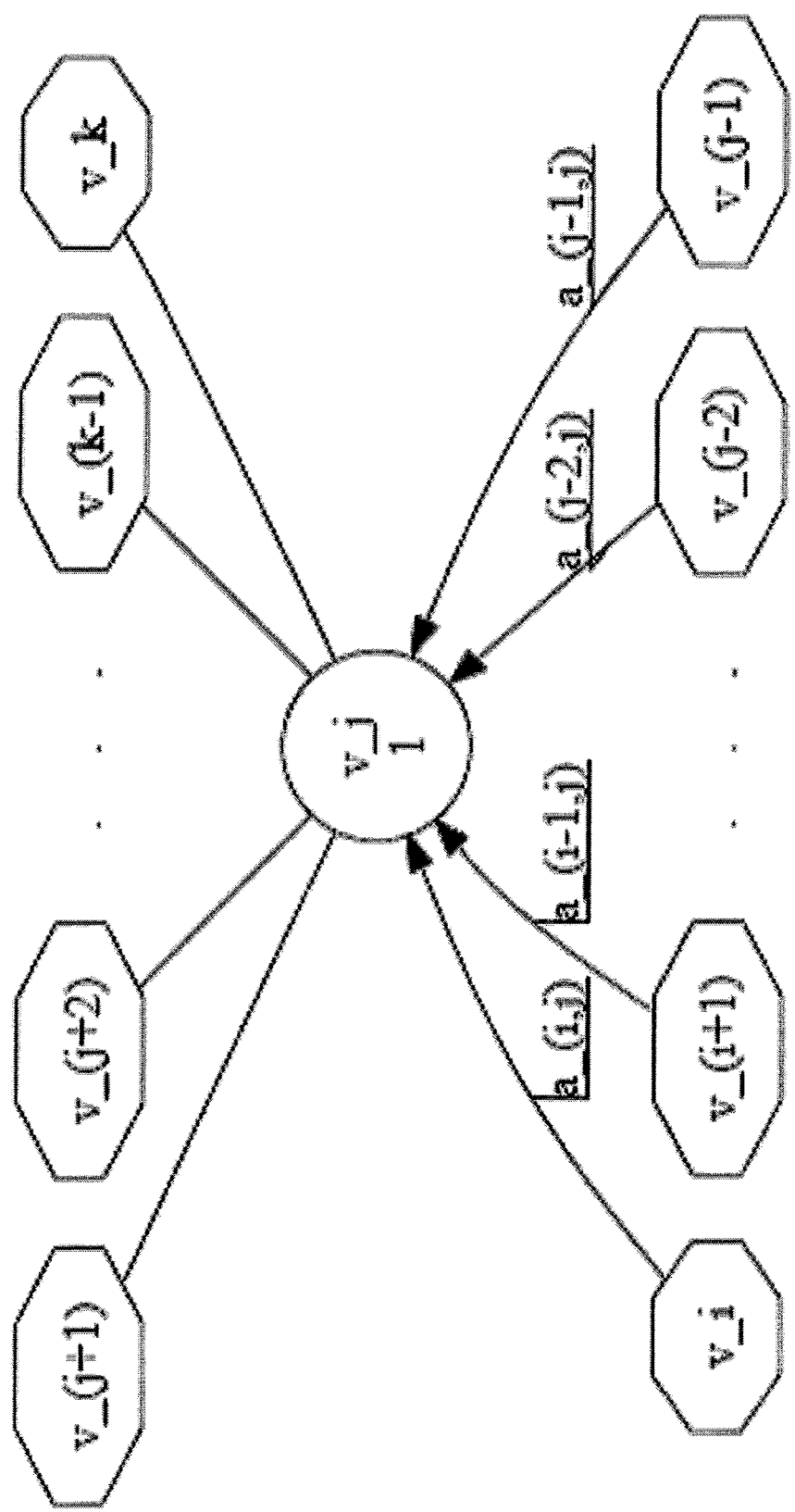
FIG. 30 schematically illustrates an example with a non-reusable or-node of type 1.

Non-reusable or-nodes, type 1: The case of a non-reusable or-node of type 1 is depicted in FIG. 30.

As $v_i$ is of type 1, the sum of the output flow needs to be equal to the sum of the number of multiples of the minimum number required along the arcs leading into $v_j$. Formally, this can be stated as $$\sum_{m=j+1}^{k} f_{(v_j,v_m)} = \sum_{n=i}^{j-1} \frac{1}{a_{(v_n,v_j)}} f_{(v_n,v_j)}$$

Figure 31:
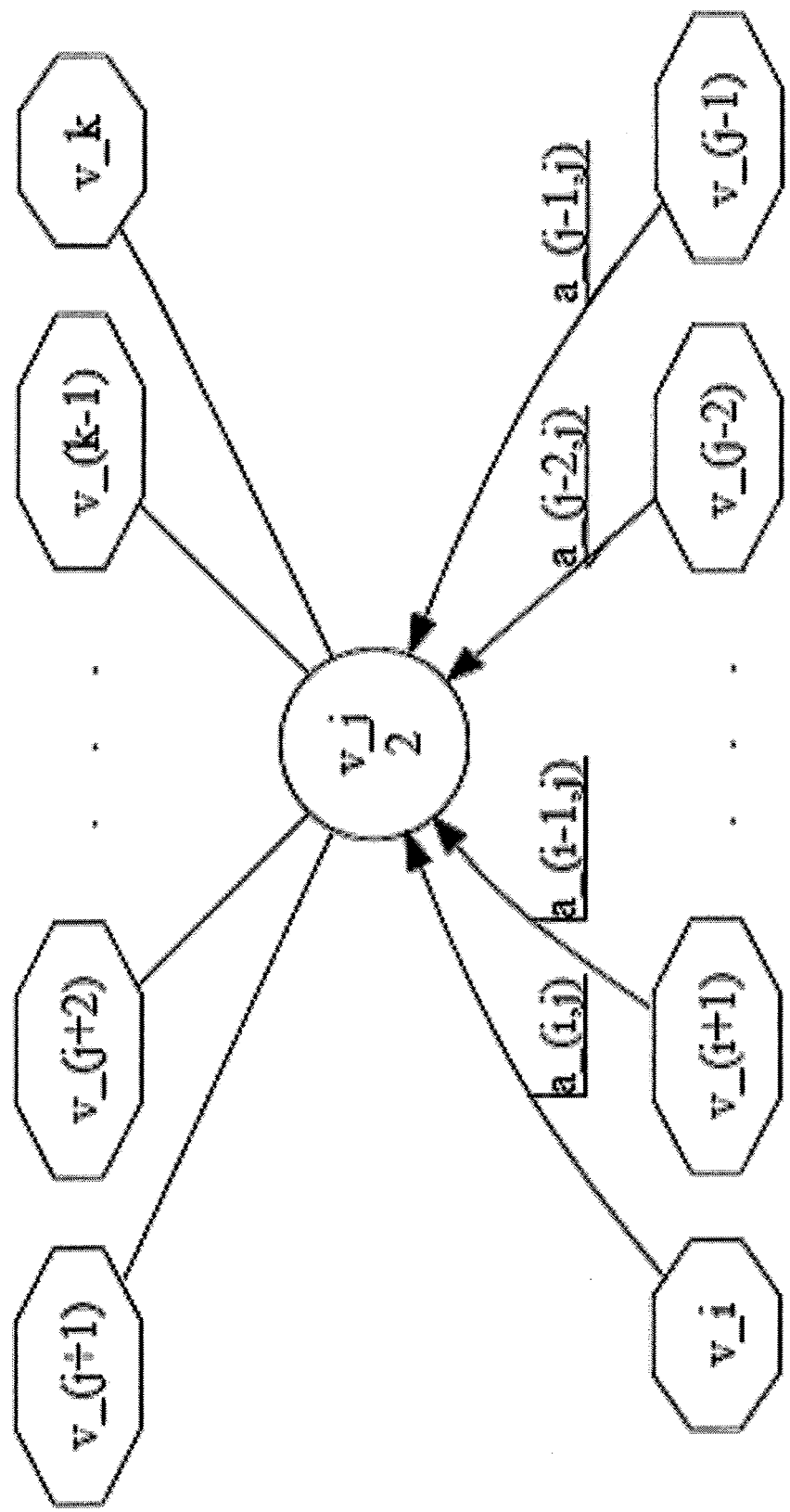
FIG. 31 schematically illustrates an example with a non-reusable or-node of type 2.

Non-reusable or-nodes, type 2: The case of a non-reusable or-node of type 2 is depicted in FIG. 31.

As $v_j$ is of type 2, each of the output arcs to have a flow less than or equal to the sum of the number of multiples of the minimum number required along the arcs leading into $v_j$. Formally, this can be stated:

$$\bigwedge_{m=j+1}^{k} \left( f_{(v_j,v_m)} \leq \sum_{n=i}^{j-1} \frac{1}{a_{(v_n,v_j)}} f_{(v_n,v_j)} \right)$$

Figure 32:
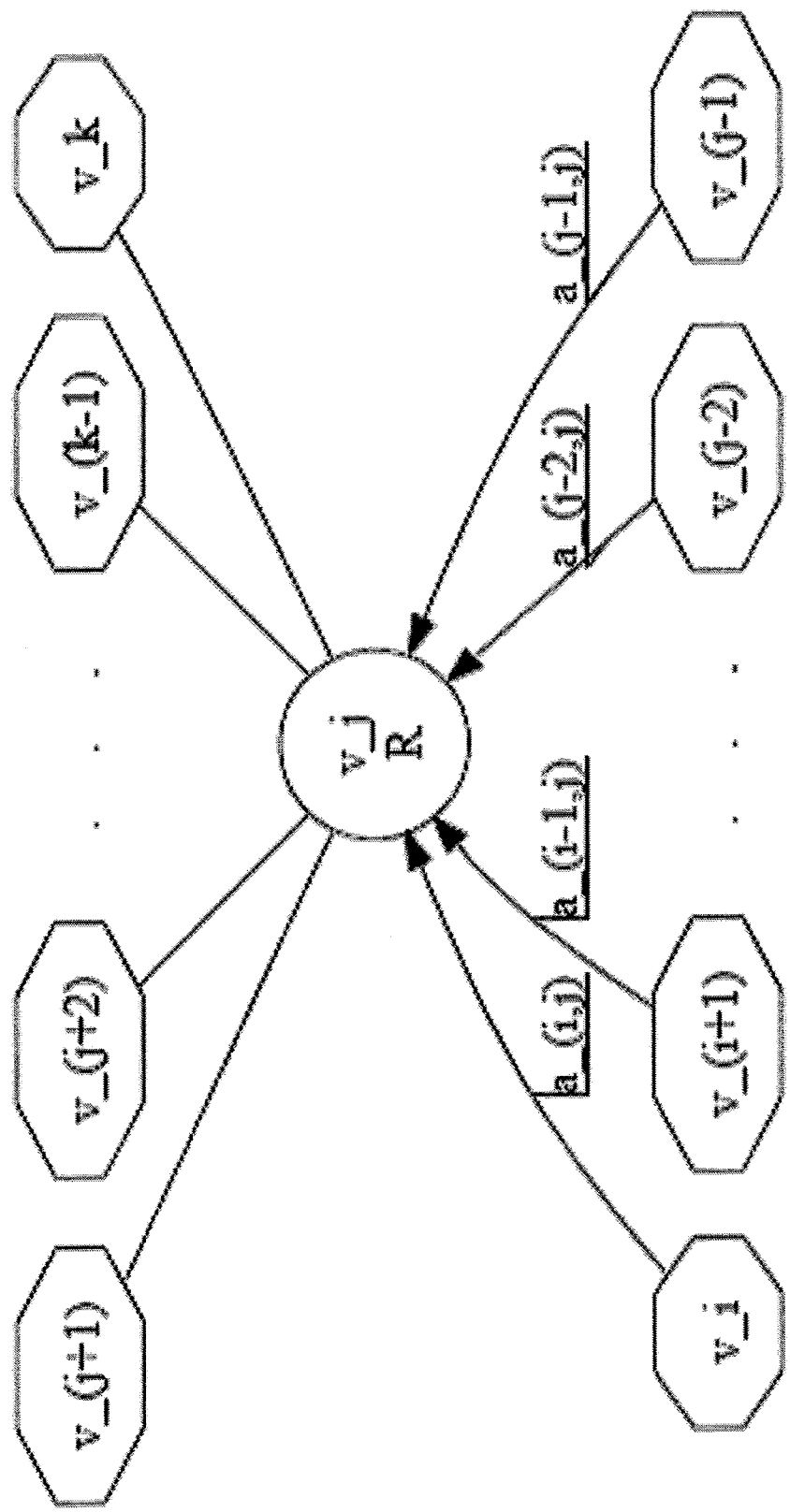
FIG. 32 schematically illustrates an example with a reusable or-node.

Reusable or-nodes: The case of a reusable or-node is depicted in FIG. 32.

To simplify the equations, the same reasoning can be used as with and-nodes: when finding the minimum cost it is never desirable to accomplish a reusable node more than once. This implies that the flow along an ingoing edge will be either 0 or the required minimum number. In this case, it will also be nonzero on at most 1 edge. As in the case of reusable and-nodes, it is only desirable to accomplish the node if the result is to be used. Formally, we can state this as the following three relations.

$$\left( \bigvee_{m=j+1}^{k} (f_{(v_j,v_m)} > 0) \right) \iff \left( \bigvee_{n=i}^{j-1} (f_{(v_n,v_j)} = a_{(v_n,v_j)}) \right)$$

$$\bigwedge_{n=i}^{j-1} \left( (f_{(v_n,v_j)} = a_{(v_n,v_j)}) \Rightarrow \left( \left( \bigwedge_{m=i}^{n-1} f_{(v_m,v_j)} = 0 \right) \wedge \left( \bigwedge_{m=n+1}^{j-1} f_{(v_m,v_j)} = 0 \right) \right) \right)$$

$$\left( \bigwedge_{m=j+1}^{k} (f_{(v_j,v_m)} = 0) \right) \iff \left( \bigwedge_{n=i}^{j-1} (f_{(v_n,v_j)} = 0) \right)$$

As was noted, one of the consequences of reusability mattering is that the goal also matters when determining the optimal way to accomplish a sub-attack. Therefore, the extended attack jungle has to be pruned with respect to the given target, and then the equations can be derived. There is also the problem of not getting the trivial (and valid) all-zero solution. To solve these problems, the following three steps can be followed:
1. Prune the extended attack jungle (V,E,A,r,M) with respect to the goal g by replacing (V,E) by the induced subgraph defined by reachability to g. Let (V',E',A,r,M) denote this pruned extended attack jungle.
2. Add a new node g' to V, and a new edge (g,g') to E and let $M((g',g))=1$.
3. Derive the equations as above and solve for integer solutions under the extra condition that $f_{(g,g')}=1$.

This subgraph will contain exactly the relevant edges for the goal in question, and by adding the extra node g' and the condition on $f_{(g,g')}$, the accomplishment of g will be guaranteed.

As there is not necessarily a unique solution to the above system of equation, there total cost of the attack needs to be defined, to be used as an objective function to minimise when solving the system.

Let (V,E) be a directed graph. Then the set of direct successors to a node v in V is the set {v': (v,v') belongs to E} and is denoted DS(v).

To state the objective function in a structured way, the ordering of the atomic attacks need to be defined stricter. Suppose that $v_0, v_1, \ldots, v_{n\_1-1}$ are non-reusable atomic attacks of type 1, $v_{n\_1}, v_{n\_1+1}, \ldots, v_{n\_1+n\_2-1}$ are non-reusable atomic attacks of type 2 and $v_{n\_1+n\_2}, \ldots, v_{n\_1+n\_2+n\_R-1}$ are reusable atomic attacks.

The cost of an attack is then defined as the sum $$C = \sum_{m=0}^{n_1-1} \left( \sum_{u \in DS(v_m)} c_m f_{(v_m,u)} \right) + \sum_{m=n_1}^{n_1+n_2-1} \left( c_m \max_{u \in DS(v_m)} f_{(v_m,u)} \right) + \sum_{m \in \{i \in \{n_1+n_2,\ldots,n_1+n_2+n_R-1\}: \exists u \in DS(v_i): f_{(v_i,u)} \neq 0\}} c_m$$

To summarize some important issues with respect to reusability, it may be stated that when reusability matters, each of a number of attack nodes is associated with an indication whether the attack is reusable, and edges between attack nodes are also weighted. The weight of each edge between a reusable attack node and a successor attack node is representative of the number of times the attack of the reusable attack node needs to be reused to reach the successor node. With reference to the previously mentioned attribute-dependent set of equation systems, this means that this set of equation systems should also be dependent on the edge weights.

For a better understanding of the idea of ranking countermeasures or sets of countermeasures, this novel concept will now be described again from a slightly different perspective, using a number of illustrative examples.

Ranking of Countermeasures

To compare the effectiveness of countermeasures against each other, it is necessary to have a measurable value associated with each countermeasure, which describes its "effectiveness".

In a particular example, we first define a countermeasure to be a set of leaf-nodes that the countermeasure counters. Secondly, we define the rank of a countermeasure, to be a function of the attribute values of the sinks in the attack jungle the countermeasure is applied to. The rank of a set of countermeasures is defined analogously, but with more than one countermeasure applied. Note that the rank can also be computed for an attack jungle where no countermeasures are applied. The effectiveness of countermeasures can now be judged based on how their rank compares to each other (and the rank of the original attack jungle, without any extra countermeasures at all).

Based on these definitions, countermeasures can be compared, preferably by iteratively solving the above mentioned equation systems. The following example describes the steps taken to compare a set of countermeasures against each other.
1. Build an attack jungle of the system that is under study.
2. Apply zero or more countermeasures to the attack jungle, by marking the leaf-attacks that are made impossible by the countermeasure as "impossible" according to the above description, or by modifying the attribute value in the leaf-nodes that are affected by the countermeasure. Zero countermeasures could be used to generate a "reference system" to compare to, or to simply obtain information about the operational status of the initial system (without any countermeasures applied).
3. Convert the attack jungle into one or more equation systems as described above.
4. Associate attribute values with each leaf-node according to the attribute(s) that are to be studied.
5. Solve said equation system(s).

6. Extract the attribute values from the intermediate nodes and sinks of the attack jungle from the solution(s) to said equation system(s).
7. Compute the rank of the set of countermeasures.

It shall be noted that the built attack jungle may contain only or-nodes, only and-nodes, or a mixture of both. It is also possible that other types of nodes, e.g., XOR-nodes, are introduced. (An example of an XOR function could be the use of two chemical compounds in an industry process, each individually "lethal" but when used together they neutralize each other.)

These other types of nodes may have to be dealt with in a special way, but the or- and-nodes can still be treated as described here even though other node types gets introduced in the future.

The attribute values may be of different types, depending on what is to be analyzed. They can be, e.g., Boolean for the case of detecting if an attack is possible to perform or not, they may be floating point values, or integers, or intervals of values (expressing e.g. uncertainty).

It shall be noted that the building of the attack jungle in step one can be done by a human knowledgeable about the system under study, or automatically by an apparatus which derives the attack jungle from a description of the system and/or from inputs of sensors reporting current system configuration status. The same is true for the assignment of attribute values for the atomic attacks; it can be done either by a human or by an apparatus. The apparatus can base its decisions on input from, e.g., sensors in the system, or from statistical data collected in advance.

An example of automatic generation of the attack jungle is where each communication unit in a network submits a list of it currently installed software to a supervising entity in the network. The supervising entity has or retrieves a list of known vulnerabilities in the software installed on the units (e.g. using CVE). From this information the supervising unit can build an attack jungle modeling attacks that can be performed on the system, e.g., an attacker exploits a vulnerability in the software of a web-server (attack A), gets access to the web-server, and from there utilizes another vulnerability in a database connected to the web-server (attack B) to access the data in the database (attack goal).

Another conceivable example of automatic generation of an attack jungle is that a (Visual) Network Rating Methodology (V)NRM [16, 17] description is input to the apparatus, which builds an attack jungle, where each attack is a breach of claims is identified as an attack.

A third example is that secure remote attestation is used, e.g. according to system measurements carried out by a Trusted Platform Module (TPM) preferably implemented according to the Trusted Computing Group (TCG) specifications.

In case the attack jungle contains cycles, it is necessary to reduce the attacks involved in each cycle into one attack representing the equivalence class of all the attacks in the cycle. This can be done as described above.

The equations derived from the attack jungle are derived for the and-nodes and the or-nodes as described above, and associates a value with each node (except for the leaf nodes, i.e., the atomic attacks, which have already been assigned values).

The method can be followed no matter if the sought property to compare is difficulty, whether an attack is possible or not, or any other compositional property. It can also be followed if the property sought is cost, or any combination of the above mentioned properties.

Using the above mechanism for computing the rank of the countermeasures, it is possible to compare the countermeasures (or combinations of countermeasures) against each other. This can be done by the following steps:
1. Compute the rank of the attack jungle when no countermeasure is applied.
2. Compute the rank of the attack jungle when each of the countermeasure combinations is applied to the system.
3. The countermeasure combinations can now be ordered (according to some ordering) by their ranks.

Since there potentially are very many combinations of countermeasures, it may not be feasible to compare all combinations. Therefore it may be necessary to make a selection of which combinations to use. It shall be noted that it is most likely the case that applying all conceivable countermeasures gives the best security improvement; however, this is also the most expensive approach. It may also be the case that one or more combinations of countermeasures have more or less the same effect, and it would be wasteful to implement them all in this case. As an example, a rank/cost ratio could be used to decide the most preferred countermeasures. It may also be possible to integrate cost into the rank calculations to estimate some form of cost-effectiveness.

When an order has been imposed on the combinations of countermeasures, the most effective countermeasure combinations can be selected for application to the system according to this order. The application of these countermeasures can now be performed by, e.g., a human incorporating them into specification text for the system, implementing them in physical system (or program code), or enabling/disabling certain functionality in the system. It is noted that an apparatus may be able to perform these actions automatically as well (with or without the aid of a human). Using the example given above with the communication units reporting their software version to supervising unit, it can be seen that the supervising unit may as a countermeasure to a detected vulnerability in the web-server order the web-server to update its software to a new version (where the vulnerability has been corrected).

Figure 33:
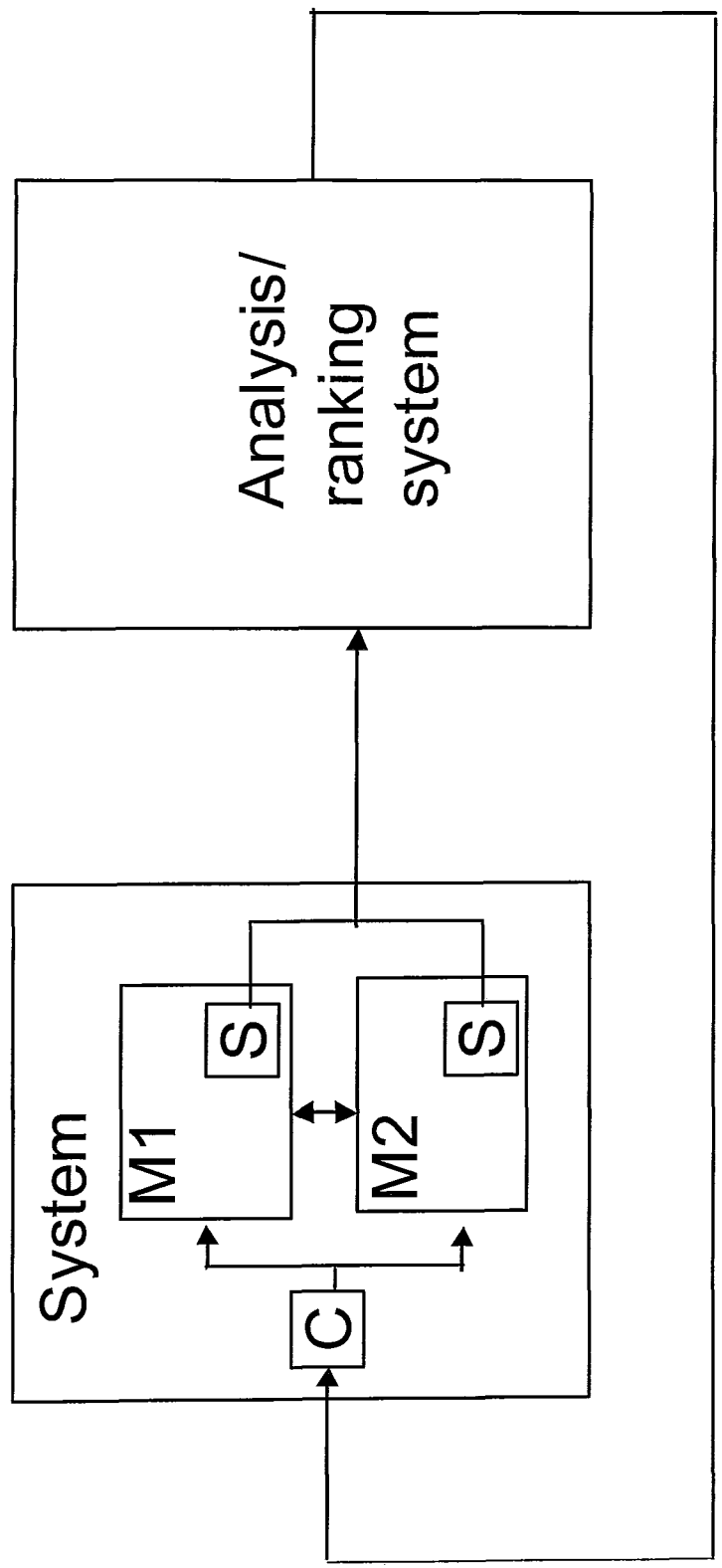
FIG. 33 shows an example of how a security analysis/countermeasure ranking apparatus according to the present invention could be used to analyze and reconfigure a technical system.

FIG. 33 shows an example of how a security analysis/countermeasure ranking apparatus according to the present invention could be used to analyze and reconfigure a technical system.

The technical system under analysis is in this example assumed to have two sub-modules M1 and M2 which cooperate to implement the system's functionality. Each module has a sensor, S, which intermittently (or by request) report system operational properties/parameters/configuration to the analysis system of the present invention (the reports are preferably transferred in a secure way). The security analysis is carried out as described above and suitable countermeasures are selected. These countermeasures are signaled back (preferably in a secure fashion) to a configuration module C which modifies system parameters/configuration accordingly.

In the following, some of the optional and non-optional features of exemplary embodiments of the present invention are summarized.

An example of a security method and corresponding system/apparatus configured for generating information for acting on a technical system for improving secure operation of said system:

Obtaining/providing (generating or receiving) a representation of system attacks or vulnerabilities in the form of an attack jungle, where vertices of said jungle have associated attributes.

Conversion of said attack jungle to a plurality of equation system(s) possibly including constraints, each of said equation system(s) containing/comprising variables associated with said attributes, Assigning (or receiving as input) values to at least some variables associated with source vertices of said attack jungle, Solving said equation system(s), Determining (or receiving as input) values of attributes of at least one intermediate node and/or sink by extracting the associated variable values from the solution(s) of said equation system(s); and Outputting at least one of said determined values of attributes of at least one intermediate node and/or sink as a rank of one or more countermeasures applied to the technical system, or as information of the operational status of the system under consideration.

For example, at least one of the nodes in the attack jungle may be a conjunctive node and/or at least one of the nodes in the attack jungle may be a disjunctive node.

In an exemplary embodiment, the attack jungle is preferably built by analyzing an automatically generated attack graph generated from a system description.

Alternatively, the attack jungle is built by a human and applied as input to the security system or technical decision support system of the invention.

In another exemplary embodiment, the conversion of the attack jungle to one or more equation system(s), with additional constraints, includes the following optional pre-processing step:

Each cycle in the attack jungle, $C_i$ consisting of only disjunctive nodes, is substituted for one single node $w_i$. The resulting node $w_i$ has as in-edges all $(u, w_i)$ such that u is a member of Pre(v), for all v in $C_i$, and as out-edges all $(w_i, u)$ such that v is a member Pre(u) for all v in $C_i$.

In an exemplary embodiment, each non-source node is associated with an equation in the following way:

The value of a variable, x associated with a conjunctive node, v, is determined by the equation:

x=f(V(Pre(v))), where f is a conjunctive combiner, Pre(·) is a function that returns the set of direct predecessors to a node, and V(·) is a function returning the set of the associated variables to the nodes in Pre(v).

The value of a variable y associated with a disjunctive node, u, is determined by the equation:

y=g(V(Pre(u))), where g is a disjunctive combiner, Pre(·) is a function that returns the set of direct predecessors to a node, and V(·) is a function returning the set of the associated variables to the nodes in Pre(v).

As an example, a constraint may be created for each Strongly Connected Component, S, according to:

There must be a node w in S, such that w is not a conjunctive node and the associated variable z is equal to g(V(Pre(w)\S)), where g is a disjunctive combiner, Pre(·) is a function that returns the set of direct predecessors to a node, V(·) is a function returning the set of the associated variables to the nodes in Pre(v), and \ is set difference.

The attribute values in the above examples may be assigned by a human, and/or the attribute values may be assigned by a device taking input from sensors in the technical system. An example of a sensor could be a mechanism that measures the number of packets arriving from a certain cell in a telephony network. This could be used by a countermeasure actuator to decide to activate a countermeasure in form of disconnecting the offending cell from the network. Other examples include reporting of software version, used cryptographic algorithms, how long a security key has been in use, etc.

In an example, the attribute sought is at least one of: difficulty, whether a certain attack is possible to accomplish, any property with compositional behavior and cost.

The attribute sought may thus be a subset of the power set of difficulty, whether a certain attack is possible to accomplish, any property with compositional behavior and cost.

In a preferred exemplary embodiment of the invention, the security method/system of the invention provides a ranking of countermeasures by using the above described procedure to first determine the attribute values for the attack jungle when no countermeasure is applied (call this set of values A), and using the above described procedure to determine the attribute values for the attack jungle when one or more countermeasures in combination have been applied (call these sets of values B1, B2, B3, . . . , Bn), and finally ranking the countermeasures by comparing Bi to A, for 1<=i<=n.

Preferably, but not necessarily, Bi, for 1<=i<=n, describes all possible combinations of countermeasures for the given attack jungle. Alternatively, however, a pre-selected set of countermeasures are considered. Normally, the most effective countermeasures are selected for application to the system. It is clearly possible to apply the selected countermeasures automatically to the technical system.

As previously indicated, the attribute values may be floating point numbers, integers, Boolean values, or intervals.

With regard to computer program products, the security analysis procedure proposed by the invention may be implemented as software in the form of program modules, functions or equivalent. The software may be written in any type of computer language, such as C, C++ or even specialized languages. In practice, the relevant steps, functions and actions of the invention are mapped into a computer program, which when being executed by the computer system effectuates the analysis and computations associated with the security analysis of the considered technical system, using appropriate input. In the case of a personal computer based system, the computer program used for the security analysis is normally encoded or carried on a computer-readable medium such as a CD, DVD or similar memory structure for distribution (including also downloading of the program over the Internet) to an operator, which then may load the program into a suitable computer system for subsequent execution.

Examples of Advantages of the Invention:

Possibility to compare combinations of countermeasures against each other in terms of effectiveness with respect to risk reduction (and optionally taking also cost of the applied countermeasures into account).

Possibility to analyze more complex (and real-world like) attack models compared to standard attack trees (optional).

Possibility to handle reusable attacks (optional).

Possibility to handle cycles in attack graphs (optional).

The embodiments described above are merely given as examples, and it should be understood that the present invention is not limited thereto. Further modifications, changes and improvements which retain the basic underlying principles disclosed and claimed herein are within the scope of the invention.

REFERENCES

[1] Amenaza. The securitree burglehouse tutorial. Technical report, Amenaza Technologies Limited, August 2006.
[2] T. H. Cormen, C. E. Leiserson, R. L. Rivest, and C. Stein. Introduction to algorithms. MIT Press, Cambridge, Mass., USA, 2001.

[3] K. Daley, R. Larson, and J. Dawkins. A structural framework for modeling multi-stage network attacks. icppw, 00:5, 2002.

[4] J. Dawkins, C. Campbell, R. Larson, K. Fitch, T. Tidwell, and J. Hale. Modeling network attacks: Extending the attack tree paradigm. In Proc. of Third Intl. Systems Security Engineering, 2002.

[5] J. Dawkins and J. Hale. A systematic approach to multi-stage network attack analysis. In IWIA '04: Proceedings of the Second IEEE International Information Assurance Workshop (IWIA'04), page 48, Washington, D.C., USA, 2004. IEEE Computer Society.

[6] G. Balbo et al., Introductory Tutorial—Petri Nets, Jun. 26-30, 2000.

[7] R. Larson, K. Fitch, T. Tidwell, and J. Hale. Modeling internet attacks. In Proc. of the 2001 IEEE Workshop on Information Assurance and Security, 2001.

[8] S. Mauw and M. Oostdijk. Foundations of attack trees. In D. Won and S. Kim, editors, International conference on information security and cryptology—icisc 2005, LNCS 3935, pages 186-198, Seoul, Korea, 2005. Springer-Verlag, Berlin.

[9] J. P. McDermott. Attack net penetration testing. In NSPW '00: Proceedings of the 2000 workshop on New security paradigms, pages 15-21, New York, N.Y., USA, 2000. ACM Press.

[10] A. Opel. Design and implementation of a support tool for attack trees.

[11] B. Schneier. Attack trees. Dr Dobbs Journal, 24(12):21-22, 24, 26, 28-29, December 1999.

[12] O. Sheyner and J. M. Wing. Tools for generating and analyzing attack graphs. In F. S. de Boer, M. M. Bonsangue, S. Graf, and W. P. de Roever, editors, FMCO, volume 3188 of Lecture Notes in Computer Science, pages 344-372. Springer, 2003.

[13] W. E. Vesely, J. Dugan, J. Fragola, J. Minarick III, and J. Railsback. Fault Tree Handbook with Aerospace Applications. National Aeronautics and Space Administration, August 2002.

[14] Wikipedia. http://en.wikipedia.org/wiki/microprocessor.

[15] P. N. World. http://www.informatik.uni-hamburg.de/tgi/petrinets.

[16] http://chacs.nrl.navy.mil/projects/VisualNRM.

[17] A. Moore et al., Visual NRM User's Manual, May 31, 2000.

[18] W. E. Vesley et al., Fault Tree Handbook, from U.S. Nuclear Regulatory Commission, January 1981.

The invention claimed is:

1. An apparatus for reconfiguring a technical system based on analysis of security of said technical system, said apparatus comprising:
an input for receiving technical information characterizing the technical system;
a computer configured to perform the following acts:
providing, based on the received technical information, a representation of potential attacks to the technical system in a directed graph of attack nodes having attributes related to the technical system, the directed graph associating each of a number of attack nodes with an indication whether a corresponding attack is reusable and weighting edges between the attack nodes, a weight of an edge between a reusable attack node and a successor attack node being representative of a number of times an attack of the reusable attack node is to be reused in order to reach the successor attack node;
providing a ranking list that ranks sets of countermeasures to enable a selected set of countermeasures to be taken to improve security of the technical system, each set of countermeasures comprising at least one countermeasure, wherein providing the ranking list further comprises:
logically applying each set of countermeasures to attacks in said directed graph; and
determining a rank for each applied set of countermeasures based on effectiveness of the applied set of countermeasures with respect to reduction of risk of attacks;
converting the directed graph into an attribute-dependent set of equation systems;
to provide attribute values in said directed graph or in said attribute-dependent set of equation systems is configured to associate attribute values with each of a number of leaf nodes in the directed graph,
to extract attribute values from at least one intermediate node and/or root node in said directed graph from the solved equation systems, and
compute a rank based on the extracted attribute values;
wherein a set of countermeasures is defined as a set of leaf nodes in the directed graph of attack nodes that the set of countermeasure counters, and the computer is configured to determine the rank of a set of countermeasures as a function of the attribute values of said at least one intermediate node and/or root node;
a selector configured to select among the sets of countermeasures having highest rank; and
a system reconfiguration unit configured to apply the selected set of countermeasures to the technical system.

2. The apparatus of claim 1, wherein the computer is further configured to provide values to a first subset of attributes, wherein said computer is configured for logically applying, for each set of countermeasures, the set of countermeasures to affect at least one of the values of said first subset of attributes, and for propagating the countermeasure-affected values of said first subset of attributes to a second subset of attributes, and extracting values of said second subset of attributes to compute a rank of the applied set of countermeasures.

3. The apparatus of claim 2, wherein the computer is configured to determine the effectiveness of a set of countermeasures based on comparison of how much values of said second set of attributes are affected by the applied set of countermeasures in relation to the corresponding values of said second set of attributes without any applied countermeasures.

4. The apparatus of claim 2, wherein the computer is further configured to perform the following acts:
providing values to said first subset of attributes in said directed graph or in said attribute-dependent set of equation systems;
solving the attribute-dependent set of equation systems to propagate the countermeasure-affected values of said first subset of attributes to said second subset of attributes; and
extracting values of said second subset of attributes from the solved equation systems to compute a rank of the applied set of countermeasures.

5. The apparatus of claim 4, wherein said attribute-dependent set of equation systems is also dependent on said edge weights.

6. The apparatus of claim 1, wherein said directed graph of attack nodes includes cycles, and said apparatus further comprises a graph modifier for modifying the directed graph by replacing a set of cyclically interconnected attack nodes by a single representative attack node.

7. The apparatus of claim 1, wherein risk is defined as the expected loss of one or more attacks being realized.

8. The apparatus of claim 1, wherein said effectiveness also includes consideration of cost for applying the countermeasures.

9. The apparatus of claim 1, wherein the computer is configured for assessing the risk reduction of an applied set of countermeasures in relation to the cost for applying the countermeasures.

10. The apparatus of claim 1, wherein said technical system is a communication network having a number of communication units interconnected by communication links, wherein at least one of said units and/or links are vulnerable to attacks.

11. The apparatus of claim 1, further comprising at least one sensor configured for obtaining said technical information characterizing the technical system.

12. The apparatus of claim 1, wherein the computer is configured to rank the sets of countermeasures based on comparison with a reference system in which no countermeasures are applied.

13. A technical decision support system for analyzing the security of a technical system to enable reconfiguration of the technical system for improved system security, said technical decision support system comprising:
means for receiving technical information characterizing the technical system;
a computer configured to perform the following acts:
providing, based on the received technical information, a representation of potential attacks to the technical system in a directed graph of attack nodes having attributes related to the technical system, the directed graph associating each of a number of attack nodes with an indication whether a corresponding attack is reusable and weighting edges between the attack nodes, a weight of an edge between a reusable attack node and a successor attack node being representative of a number of times an attack of the reusable attack node is to be reused in order to reach the successor attack node;
ranking sets of countermeasures in a ranking list to enable a selected set of countermeasures to be taken to improve system security, each set of countermeasures comprising at least one countermeasure;
logically apply each set of countermeasures to attacks in said directed graph; and
determine a rank for each applied set of countermeasures based on effectiveness of the applied set of countermeasures with respect to reduction of risk of attacks;
convert the directed graph into an attribute-dependent set of equation systems;
provide attribute values in said directed graph or in said attribute-dependent set of equation systems is configured to associate attribute values with each of a number of leaf nodes in the directed graph,
extract attribute values from at least one intermediate node and/or root node in said directed graph from the solved equation systems, and
compute a rank based on the extracted attribute values;
wherein a set of countermeasures is defined as a set of leaf nodes in the directed graph of attack nodes that the set of countermeasure counters, and the computer is configured to determine the rank of a set of countermeasures as a function of the attribute values of said at least one intermediate node and/or root node.

14. The technical decision support system of claim 13, wherein the computer is further configured:
to provide values to a first subset of attributes,
to logically apply, for each set of countermeasures, the set of countermeasures to affect at least one of the values of said first subset of attributes,
to propagate the countermeasure-affected values of said first subset of attributes to a second subset of attributes, and
to extract values of said second subset of attributes to compute a rank of the applied set of countermeasures.

15. The technical decision support system of claim 14, wherein the computer is configured to determine the effectiveness of a set of countermeasures based on comparison of how much values of said second set of attributes are affected by the applied set of countermeasures in relation to the corresponding values of said second set of attributes without any applied countermeasures.

16. The technical decision support system of claim 14, wherein the computer is further configured to:
provide values to said first subset of attributes in said directed graph or in said attribute-dependent set of equation systems;
to solve the attribute-dependent set of equation systems to propagate the countermeasure-affected values of said first subset of attributes to said second subset of attributes; and
to extract values of said second subset of attributes from the solved equation systems to compute a rank of the applied set of countermeasures.

17. The technical decision support system of claim 16, wherein said attribute-dependent set of equation systems is also dependent on said edge weights.

18. The technical decision support system of claim 13, wherein said directed graph of attack nodes includes cycles, and said system further comprises means for modifying the directed graph by replacing a set of cyclically interconnected attack nodes by a single representative attack node.

19. The technical decision support system of claim 13, wherein risk is defined as the expected loss of one or more attacks being realized.

20. The technical decision support system of claim 13, wherein said effectiveness also includes consideration of cost for applying the countermeasures.

21. The technical decision support system of claim 13, wherein the computer is configured to assess the risk reduction of an applied set of countermeasures in relation to the cost for applying the countermeasures.

22. The technical decision support system of claim 13, wherein said technical system is a communication network having a number of communication nodes interconnected by communication links, wherein at least one of the nodes and/or links are vulnerable to attacks.

23. The technical decision support system of claim 13, further comprising at least one sensor configured for obtaining said technical information characterizing the technical system.

24. A computer program product for analyzing the security of a technical system to enable reconfiguration of the technical system for improved system security, the computer program product comprising instructions stored on a non-transitory computer-readable medium which, when executed by a computer system, perform the acts of:
receiving technical information characterizing the technical system;
providing, based on the received technical information, a representation of potential attacks to the technical system in a directed graph of attack nodes having attributes related to the technical system, the directed graph associating each of a number of attack nodes with an indication whether a corresponding attack is reusable and weighting edges between the attack nodes, a weight of an edge between a reusable attack node and a successor attack node being representative of a number of times an attack of the reusable attack node is to be reused in order to reach the successor attack node;

ranking sets of countermeasures in a ranking list to enable a selected set of countermeasures to be taken to improve system security, each set of countermeasures comprising at least one countermeasure, by:
  logically applying each set of countermeasures to attacks in said directed graph; and
  determining a rank for each applied set of countermeasures based on effectiveness of the applied set of countermeasures with respect to reduction of risk of attacks;
converting the directed graph into an attribute-dependent set of equation systems;
  providing attribute values in said directed graph or in said attribute-dependent set of equation systems is configured to associate attribute values with each of a number of leaf nodes in the directed graph,
  extracting attribute values from at least one intermediate node and/or root node in said directed graph from the solved equation systems, and
computing a rank based on the extracted attribute values;
wherein a set of countermeasures is defined as a set of leaf nodes in the directed graph of attack nodes that the set of countermeasure counters, determining the rank of a set of countermeasures as a function of the attribute values of said at least one intermediate node and/or root node.

25. The computer program product of claim 24, wherein said computer program further comprises instructions, which executed by the computer system, perform the acts of providing control signaling, said control signaling being generated by said instructions on the basis of the determined rank of said different sets of countermeasures.

* * * * *